US008306647B2

(12) United States Patent
Niimi et al.

(10) Patent No.: US 8,306,647 B2
(45) Date of Patent: Nov. 6, 2012

(54) FLEXIBLE MANUFACTURING SYSTEM AND CONTROL METHOD THEREFOR

(75) Inventors: Kozo Niimi, Kashihara (JP); Koji Kito, Toyota (JP); Kazuhiro Tsujimura, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 379 days.

(21) Appl. No.: 12/606,619

(22) Filed: Oct. 27, 2009

(65) Prior Publication Data
US 2010/0106281 A1    Apr. 29, 2010

(30) Foreign Application Priority Data

Oct. 29, 2008 (JP) ................. 2008-278668
Jun. 22, 2009 (JP) ................. 2009-147443

(51) Int. Cl.
*G06F 12/00* (2006.01)
*G05B 19/18* (2006.01)
(52) U.S. Cl. ................. 700/112; 700/159
(58) Field of Classification Search .......... None
See application file for complete search history.

(56) References Cited

U.S. PATENT DOCUMENTS

| | | | |
|---|---|---|---|
| 4,237,598 A | 12/1980 | Williamson | |
| 4,894,908 A * | 1/1990 | Haba et al. | 29/711 |
| 5,283,934 A | 2/1994 | Zimpel et al. | |
| 6,591,721 B2 * | 7/2003 | Stratico et al. | 82/162 |
| 2007/0119036 A1 * | 5/2007 | Parmenter et al. | 29/33 P |
| 2008/0015097 A1 | 1/2008 | Jaeger | |

FOREIGN PATENT DOCUMENTS

JP    6-63852    3/1994

* cited by examiner

*Primary Examiner* — Kakali Chaki
*Assistant Examiner* — Walter Hanchak
(74) *Attorney, Agent, or Firm* — Oblon, Spivak, McClelland, Maier & Neustadt, L.L.P.

(57) ABSTRACT

In a flexible manufacturing system, a control apparatus for a transfer device stores in a memory section thereof correlation information for correlating workpieces (ante-machining workpieces) to be attached to pallets with blank materials contained in blank material baskets. When a selected one of the pallets is to be transferred to a pallet loading station, the control apparatus determines blank materials corresponding to the workpieces to be attached to the selected one of the pallets based on the correlation information and then, controls the transfer device to transfer a blank material basket containing the determined blank materials from a basket rack to a basket loading station located adjacent to the pallet loading station in connection with transferring the selected one of the pallets to the pallet loading station. Thus, when the selected one of the pallets is transferred to the pallet loading station, it becomes possible to reduce the time taken for the worker to search for the blank material basket.

23 Claims, 16 Drawing Sheets

Transfer Reservation Information

| Reservation No. | Workpiece Kind | Number |
|---|---|---|
| Res. 1 : | Workpiece A | 3 |
| Res. 2 : | Workpiece B | 2 |
| Res. 3 : | Workpiece C | 1 |
| . | | |
| . | | |
| . | | |

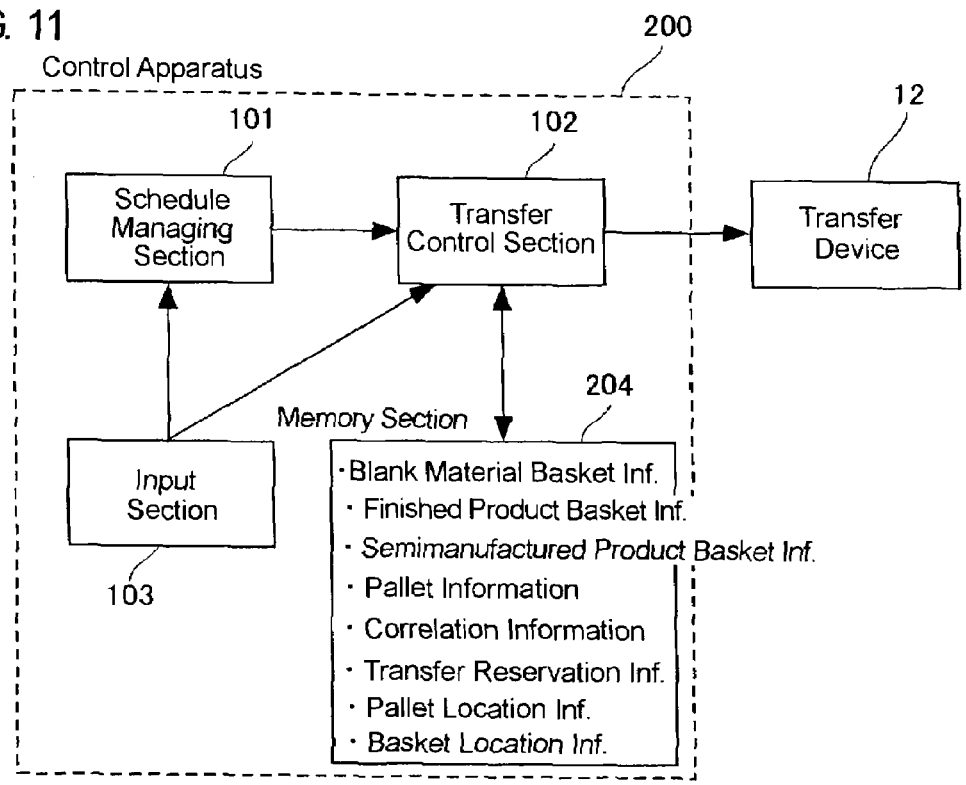

FIG. 11

FIG. 12 Transfer Reservation Information

| Reservation No. | Workpiece Kind | Machining Progress Status | Number |
|---|---|---|---|
| Res. 1 : | Workpiece A | Z(Finished) | 3 |
| Res. 2 : | Workpiece B | Y(Semimfg.) | 2 |
| Res. 3 : | Workpiece A | Y(Semimfg.) | 1 |
| Res. 4 : | Workpiece C | Z(Finished) | 3 |
| . | | | |
| . | | | |
| . | | | |

FIG. 13 Transfer Reservation Information

| Reservation No. | Workpiece Kind | Lot No. | Machining Progress Status | Number |
|---|---|---|---|---|
| Res. 1 : | Workpiece A | a1 | Z(Finished) | 3 |
| Res. 2 : | Workpiece B | b1 | Y(Semimfg.) | 3 |
| Res. 3 : | Workpiece A | a2 | Y(Semimfg.) | 1 |
| Res. 4 : | Workpiece C | c1 | Z(Finished) | 3 |
| . | | | | |
| . | | | | |
| . | | | | |

Transfer Reservation Information

| Reservation No. | Workpiece Kind | Basket No. | Machining Progress Status | Number |
|---|---|---|---|---|
| Res. 1 : | Workpiece A | 1 | Z(Finished) | 3 |
| Res. 2 : | Workpiece B | 2 | Y(Semimfg.) | 2 |
| Res. 3 : | Workpiece A | 1 | Y(Semimfg.) | 1 |
| Res. 4 : | Workpiece C | 3 | Z(Finished) | 3 |

FLEXIBLE MANUFACTURING SYSTEM AND CONTROL METHOD THEREFOR

INCORPORATION BY REFERENCE

This application is based on and claims priorities under 35 U.S.C. 119 with respect to Japanese patent applications No. 2008-278668 filed Oct. 29, 2008 and No. 2009-147443 filed Jun. 22, 2009, the entire contents of which are incorporated herein by reference.

BACKGROUND OF THE INVENTION

1. Field of the Invention

The present invention relates to a flexible manufacturing system provided with a machine tool for machining workpieces to form finished products, racks for storing a plurality of workpieces, blank materials and finished products, a transfer device for transferring blank materials and workpieces between the machine tool and the racks, and a control apparatus for controlling the transfer operation of the transfer device. Further, the present invention relates to a control method for the flexible manufacturing system.

2. Discussion of the Related Art

As flexible manufacturing systems (hereafter referred to as "FMSs") capable of a wide-variety and small-quantity production, there has been known one which is described in JP 6-63852 A for example. This Japanese application describes a system provided with machine tools for machining workpieces, a rack for storing pluralities of workpieces, blank materials and finished products, setting stations where workers perform setting operations, and a transfer device movable between these facilities. The Japanese application further describes at paragraphs [0012] and [0013] that at each setting station, the worker attaches ante-machining workpieces (hereafter referred to as "blank materials") to a pallet or detaches post-machining workpieces (hereafter referred to as "finished products") from another pallet.

More specifically, the worker performs operations at each setting station as follows. In attaching blank materials to a pallet, the worker instructs the transfer device to transfer a blank material basket containing the blank materials from the rack to the setting station and at the same time, to transfer from the rack a pallet to which the blank materials are to be attached. Then, at the setting station, the worker moves the blank materials from the blank material basket to the pallet. Further, in detaching finished products from a pallet and storing them in a finished product basket, the worker instructs the transfer device to transfer the pallet with finished products attached thereto from the rack to the setting station and, at the same time, to transfer from the rack a finished product basket into which the finished products are to be put.

In the FMSs of this kind, it has been a practice to place the machining order of workpieces in machine tools under a schedule control. Thus, automatic assignments or determinations are made of the order in which pallets with workpieces attached thereon are transferred from a rack to each machine tool as well as of respective times at which such transfers are carried out. However, as mentioned earlier, the workers are required to give instructions in attaching blank materials contained in a blank material basket to a pallet and in detaching finished products from a pallet to move them to a finished product basket. More specifically, in attaching blank materials to a pallet, the worker at a setting station checks the pallet after the same is transferred to the setting station, then searches for a blank material basket containing blank materials to be attached to the pallet and instructs the transfer of the blank material basket to the setting station. In this operation, the time is taken for the worker to search for the blank material basket. Therefore, for the purpose of improving the efficiency of the system operation, it has been required to shorten such search time.

Further, it has heretofore been a practice in FMSs that finished products are not controlled on a basis of a lot which is a manufacturing unit of products. Thus, once blank materials are charged into an FMS, only the kind of each blank material is grasped, and each finished product is discharged without taking account of the lot to which it belongs. That is, it has been a practice that finished products different in lot are put in mixture into each finished product basket. However, the need for controlling finished products on a lot-by-lot basis has been proposed by the users in terms of traceability.

SUMMARY OF THE INVENTION

It is therefore an object of the present invention to provide an improved flexible manufacturing system and a control method therefor capable of improving the efficiency of the system operation.

It is also an object of the present invention to provide an improved flexible manufacturing system and a control method therefor capable of controlling finished products on a lot-by-lot basis.

Briefly, according to the present invention, there are provided an improved flexible manufacturing system and a control method therefor comprising a plurality of pallets each for attaching an ante-machining workpiece thereto; a machine tool for machining an ante-machining workpiece attached to a selected one of the pallets to form a post-machining product being a finished product or a semimanufactured product; a plurality of ante-machining product baskets each for containing ante-machining products being blank materials or semimanufactured products which are ante-machining workpieces to be attached to the pallets; a pallet rack capable of storing the plurality of pallets therein; a basket rack capable of storing the plurality of ante-machining product baskets therein; a basket loading station for temporarily placing a selected one of the ante-machining product baskets thereon in moving an ante-machining product contained in the selected one of the ante-machining product baskets to a selected one of the pallets; a pallet loading station provided to be adjacent to the basket loading station for temporarily placing the selected one of the pallets thereon in moving the ante-machining product to the selected one of the pallets; a transfer device for transferring the selected one of the pallets between the pallet rack and the pallet loading station and for transferring the selected one of the ante-machining product baskets between the basket rack and the basket loading station; and a control apparatus for performing the transfer control of the transfer device; wherein the control apparatus includes means or steps of storing correlation information which correlates the ante-machining workpieces to be attached to the pallets with the ante-machining products contained in the ante-machining product baskets; determining an ante-machining product corresponding to the ante-machining workpiece to be attached to the selected one of the pallets in connection with transferring the selected one of the pallets to the pallet loading station; and controlling the transfer device to transfer one of the ante-machining product baskets containing the determined ante-machining product, from the basket rack to the basket loading station in connection with transferring the selected one of the pallets to the pallet loading station.

With this construction, because the control apparatus stores the correlation information therein, it becomes possible to grasp the correspondence between the workpieces to be attached to the pallets and the ante-machining products. Concretely, the correlation therebetween can be established by the part number of the workpieces and the product number of the ante-machining products. Then, in connection with transferring the selected one of the pallets to the pallet loading station, the control apparatus, by utilizing the correlation information, determines an ante-machining product corresponding to the ante-machining workpiece to be attached to the selected one of the pallets and controls the transfer device to transfer an ante-machining product basket containing the determined ante-machining product which is a blank material or semimanufactured product to be attached to the pallet, to the basket loading station. Thus, the worker is not required to search for the ante-machining product basket. Accordingly, it becomes possible to reduce the time taken for the worker to search for the ante-machining product basket.

Further, in connection with the operation in which a pallet is transferred to the pallet loading station, the ante-machining product basket is transferred to the basket loading station. This can be accomplished by making the control apparatus have stored the correlation information in advance. Then, by the synchronized or connected operations, it becomes possible to further shorten the time period for the pallet to wait at the pallet loading station. As a result of the foregoing solutions, it can be realized to enhance the operating efficiency of the flexible manufacturing system.

In another aspect of the present invention, there are provided an improved flexible manufacturing system and a control method therefor comprising a plurality of pallets each for attaching an ante-machining workpiece thereto; a machine tool for machining an ante-machining workpiece attached to a selected one of the pallets to form a post-machining product being a finished product or a semimanufactured product; a plurality of ante-machining product baskets each for containing ante-machining products being blank materials or semimanufactured products which are ante-machining workpieces to be attached to the pallets; a plurality of post-machining product baskets each for containing post-machining products therein; a pallet rack capable of storing the plurality of pallets therein; a basket rack capable of storing the plurality of ante-machining product baskets and the plurality of post-machining product baskets therein; a basket loading station for temporarily placing a selected one of the ante-machining product baskets thereon in moving an ante-machining product contained in the selected one of the ante-machining product baskets to a selected one of the pallets and for temporarily placing a selected one of the post-machining product baskets thereon in moving the post-machining product attached to the selected one of the pallets to the selected one of the post-machining product baskets; a pallet loading station provided to be adjacent to the basket loading station for temporarily placing the selected one of the pallets thereon in moving the ante-machining product to the selected one of the pallets; a transfer device for transferring the selected one of the pallets between the machine tool, the pallet rack and the pallet loading station and for transferring the selected one of the ante-machining product baskets and the selected one of the post-machining product baskets between the basket rack and the basket loading station; and a control apparatus for performing the transfer control of the transfer device; wherein the control apparatus includes means or steps of storing lot information for defining as one group the plurality of ante-machining products contained in each of the ante-machining product baskets, the lot information including workpiece lot information relating to ante-machining workpieces grasped on the basis of each kind of the ante-machining workpieces and product lot information relating to the post-machining products grasped on the basis of each kind of the post-machining products, and controlling the transfer device to selectively transfer the post-machining product baskets to the basket loading station based on the workpiece lot information and the product lot information so that each of the post-machining product baskets comes to contain therein the post-machining products all of which coincide in the lot information.

With the construction in this second aspect, a post-machining product basket selected based on the workpiece lot information and the product lot information is transferred to the basket loading station. Thus, it becomes possible for the worker to put the post-machining products all of which coincide in the lot information, into the selected post-machining product basket which is intended by the worker to contain the post-machining products. Therefore, the worker (user) can control as one group the plurality of post-machining products contained in each post-machining product basket, and hence, the control on a lot-by-lot basis can be realized in the event that defectives are produced, for example.

BRIEF DESCRIPTION OF THE DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which:

FIG. 11 is a block diagram showing the functional configuration of a control apparatus of a flexible manufacturing system in the second embodiment according to the present invention;

FIG. 12 is an explanatory view for explaining transfer reservation information in the second embodiment;

FIG. 13 is an explanatory view for explaining transfer reservation information in the third embodiment according to the present invention;

DETAILED DESCRIPTION OF THE PREFERRED EMBODIMENTS

Hereafter, various embodiments of a flexible manufacturing system (hereafter referred to as "FMS") and a control method therefor according to the present invention will be described with reference to the accompanying drawings.

(First Embodiment)

Here, the FMS in a first embodiment is on the premise that blank materials are first put into a blank material basket, are finally put as finished products into a finished product basket, and are kept attached to a pallet until they are finished to the finished products after being taken out from the blank material basket. That is, the blank material basket and the finished product basket exist independently as baskets.

Figure 1:
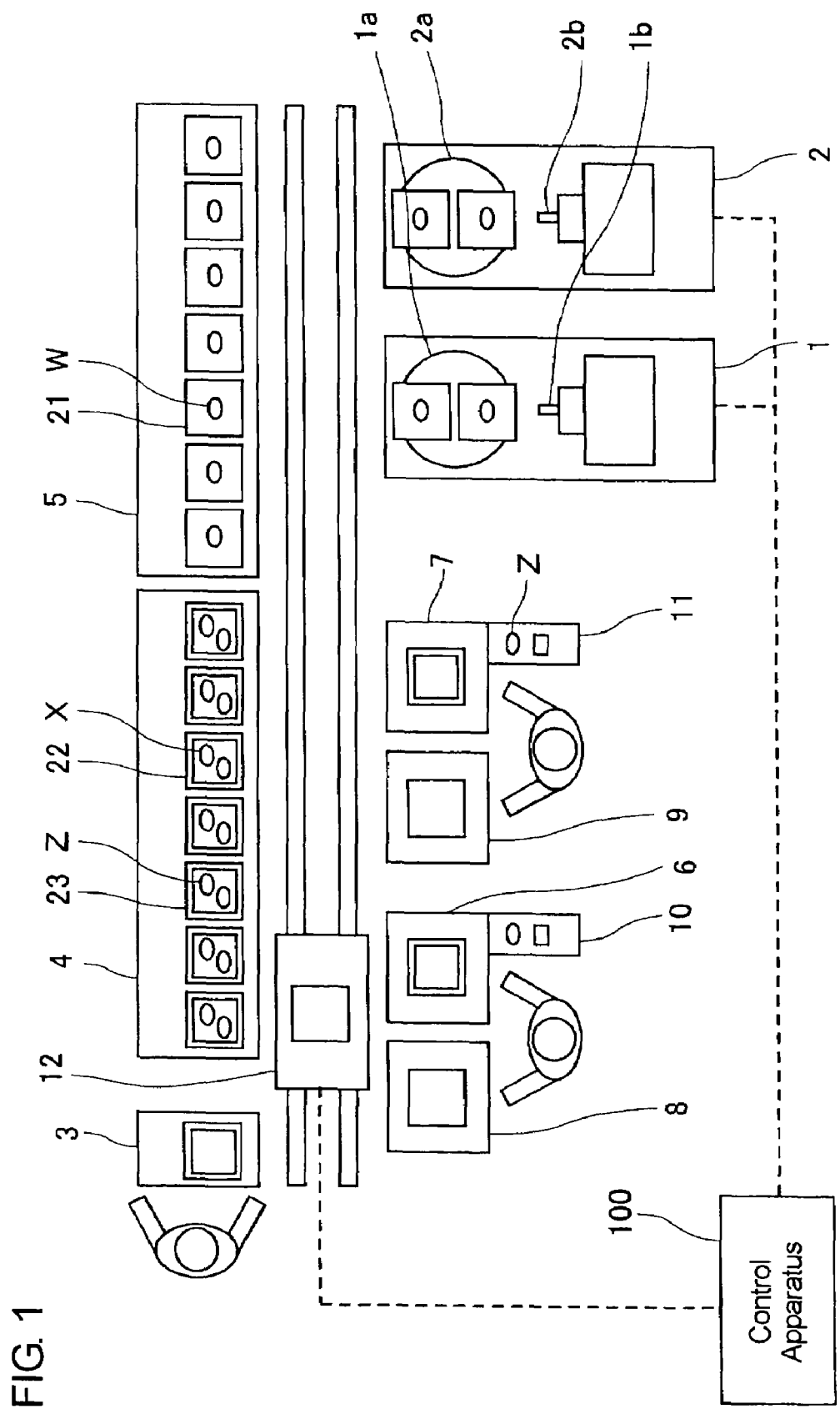
FIG. 1 is a schematic plan view showing the entire system construction of a flexible manufacturing system in each of first to fourth embodiments according to the present invention.
Figures 2, 3:
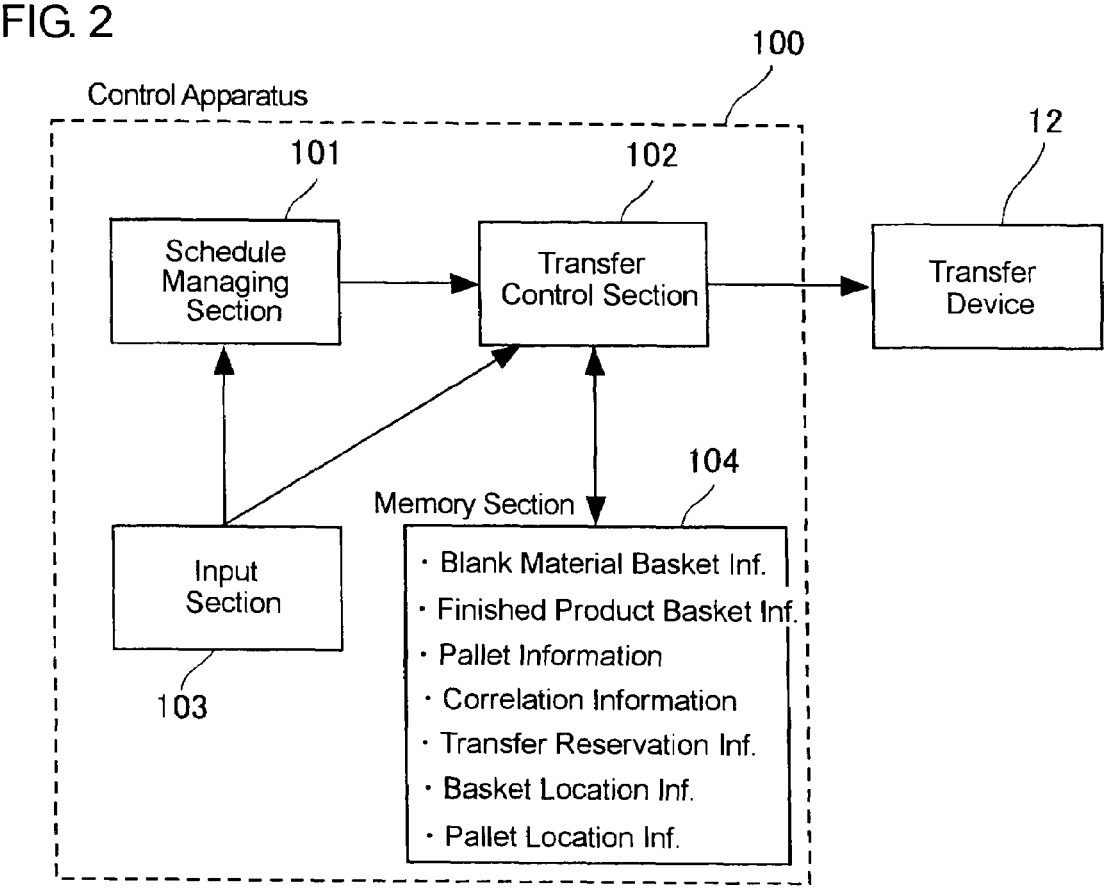
FIG. 2 is a block diagram showing the functional configuration of a control apparatus of the flexible manufacturing system in the first embodiment.
FIG. 3 is an explanatory view for explaining transfer reservation information in the first embodiment.

The construction of the FMS in the first embodiment will be described with reference to FIGS. 1 to 3. FIG. 1 is a schematic plan view showing the entire system construction of the FMS, FIG. 2 is a block diagram showing the functional configuration of a control apparatus 100 of the FMS and FIG. 3 is an explanatory view for explaining transfer reservation information.

As shown in FIG. 1, the FMS is composed of machine tools 1, 2, system loading/unloading station (hereafter often referred to as "SLD-ST") 3, a basket rack 4, a pallet rack 5, basket loading stations (hereafter often referred to as "BLD-ST" or "BLD-STs") 6, 7, pallet loading stations (hereafter often as "PLD-ST" or "PLD-STs") 8, 9, temporary support tables 10, 11, a transfer device 12, and the control apparatus 100.

The FMS is also provided with pluralities of pallets 21, blank material baskets 22 and finished product baskets 23.

Each pallet 21 has jigs arranged thereon for securing one or more workpieces W at appropriate positions and angles. The pallets 21 include pallets each capable of having one workpiece W attached thereto and pallets each capable of having a plurality of workpieces W attached thereto. On the pallet 21 capable of having a plurality of workpieces W attached thereto, there may be attached a plurality of workpieces W of the same kind or a plurality of workpieces W different in kind.

Each of the blank material baskets 22 (corresponding to "ante-machining product baskets" in the claimed invention) is able to contain a plurality of blank materials X. Each blank material basket 22 contains therein a plurality of blank materials of the same kind. Each of the finished product baskets 23 (corresponding to "post-machining product baskets" in the claimed invention) is able to contain a plurality of finished products Z therein. Each finished product basket 23 is to contain therein a plurality of finished products of the same kind.

Here, workpieces W mean the objects to be machined in the machine tools 1, 2 and are attached to a pallet 21 with jigs or the like provided on the pallet 21. Blank materials X are workpieces W which are before being machined, and mean those which are before being attached to the pallets 21. Finished products Z are workpieces W on which all of machining operations required in the FMS have been completed.

The machine tools 1, 2 are horizontal machining centers which form finished products Z by machining the workpieces W attached to each pallet 21. These machine tools 1, 2 are respectively provided with rotary tables or rotary stations 1a, 2a each capable of supporting two pallets 21 thereon and rotatable about a vertical axis. Machining operations are carried out with tools 1b, 2b attached to the machine tools 1, 2 at respective first parts on the rotary stations 1a, 2a oriented toward respective machining zones, while respective other or second parts on the rotary stations 1a, 2a oriented opposite to the respective machining zones serve not only as temporal holding stations at which finished products Z (or semimanufactured products) after machining are held temporarily until being transferred to the pallet rack 5, but also as ready stations at which pallets 21 transferred from the pallet rack 5 are set to become ready for subsequent machining operations, respectively.

The system loading/unloading station (SLD-ST) 3 serves as a station for loading blank materials X into the FMS and for unloading finished products Z from the FMS. Specifically, in loading new blank materials X, the worker sets on the SLD-ST 3 a blank material basket 22 containing the new blank materials X, and thus, the blank material basket 22 is transferred by the transfer device 12 to the basket rack 4. In unloading finished products Z, a finished product basket 23 containing the finished products Z is transferred by the transfer device 12 to the SLD-ST 3, and thereafter, the worker moves the transferred basket 23 to a suitable place outside the FMS. As referred to later, the unloading of the finished products Z can in one case be automatically carried out by the control apparatus 100 in accordance with a predetermined automatic program or can in another case be carried out to transfer a finished product basket 23 designated by the worker.

The basket rack 4 is a rack capable of placing the plurality of blank material baskets 22 and the plurality of finished product baskets 23 thereon. The basket rack 4 is provided to be adjacent to the SLD-ST 3. In the present first embodiment, the basket rack 4 is of a single stage and is capable of placing thereon seven baskets in total including blank material baskets 22 and finished product baskets 23. Of course, the basket rack 4 may be constructed to have plural stages.

The pallet rack 5 is a rack capable of placing the plurality of pallets 21 thereon. The pallet rack 5 is installed to be adjacent to the basket rack 4 and to be aligned therewith in the same direction. Further, the pallet rack 5 is installed in position to face the machine tools 1, 2. In the present embodiment, the pallet rack 5 is of a single stage and is capable of placing seven pallets 21 thereon at maximum. Of course, the pallet rack 5 may be constructed to have plural stages.

The basket loading stations (BLD-STs) 6, 7 serve as stations on each of which a blank material basket 22 is temporarily placed for enabling the worker to take blank materials X out of the blank material basket 22 and to move the blank materials X to a pallet 21. The BLD-STs 6, 7 also serve as stations on each of which a finished product basket 23 is temporarily placed for enabling the worker to move finished products Z attached to a pallet 21 to a finished product basket 23. The BLD-STs 6, 7 are provided to face the SLD-ST 3 or the basket rack 4.

The pallet loading stations (PLD-STs) 8, 9 are provided to be adjacent respectively to the BLD-STs 6, 7. The PLD-STs 8, 9 serve as stations on each of which a pallet 21 is temporarily placed for enabling the worker to attach blank materials X at the adjoining BLD-ST 6, 7 to the pallet 21. The PLD-STs 8, 9 also serve as stations on each of which a pallet 21 with finished products Z attached thereto is temporarily placed for enabling the worker to move the finished products Z onto the associated temporary support table 10, 11 or into a finished product basket 23 on the associated BLD-ST 6, 7. The PLD-STs 8, 9 are provided to face the system loading/unloading station (SLD-ST) 3 or the basket rack 4.

The temporary support table 10, the BLD-ST 6 and the PLD-ST 8 are provided to be close or adjacent to one another within the reach of one worker, while the temporary support table 11, the BLD-ST 7 and the PLD-ST 9 are provided to be close or adjacent to one another within the reach of another worker, as illustrated in FIG. 1. The temporary support tables 10, 11 are the places on each of which finished products Z detached from a pallet 21 at the associated PLD-ST 8, 9 are temporarily placed.

The transfer device 12 is movable on two straight rails which are laid to extend between the line of the SLD-ST 3, the basket rack 4 and the pallet rack 5 and the line of the PLD-STs 8, 9, the BLD-STs 6, 7 and the machine tools 1, 2. The transfer device 12 is able to transfer pallets 21 one at a time between the machine tools 1, 2, the pallet rack 5 and the PLD-STs 8, 9. Further, the transfer device 12 is able to transfer blank material baskets 22 and finished product basket 23 one at a time between the basket rack 4, the BLD-STs 6, 7 and the SLD-ST 3.

The control apparatus 100 controls the transfer operation of the transfer device 12. As shown in FIG. 2, the control apparatus 100 is composed of a schedule managing section 101, a transfer control section 102, an input section 103, and a memory section 104. The schedule managing section 101 determines the order in which workpieces W of various kinds are to be machined by the machine tools 1, 2, based on the information inputted by the worker at the input section 103. For example, when information is inputted about the kinds and numbers of workpieces W of respective kinds and respective times at which the machining of the workpieces W of the respective kinds are to be completed, the machining order of the workpieces W of the respective kinds is determined based on the information and taking into consideration the time period taken to machine one workpiece W of each kind.

The transfer control section 102 controls the transfer device 12 to transfer workpieces W to the machine tools 1, 2, based on the machining order of the workpieces W determined by the schedule managing section 101. That is, based on the determined machining order, the transfer control section 102 instructs the transfer device 12 to transfer pallets 21 placed on the pallet rack 5 one at a time to the machine tool 1, 2. When inputting a machining completion signal from each of the machine tools 1, 2, the transfer control section 102 controls the transfer device 12 to transfer a pallet 21 on each such machine tool 1, 2 to the pallet rack 5. In addition, based on other information, the transfer control section 102 controls the transfer device 12 to be moved between the SLD-ST 3, the basket rack 4, the pallet rack 5, the BLD-STs 6, 7 and the PLD-STs 8, 9. The control of the transfer device 12 will be described later in detail.

The FMS shown in FIG. 1 is exemplified as the system including the two machine tools 1 and 2, the two BLD-STs 6 and 7 and the two PLD-STs 8 and 9, to each of which the transfer device 12 is accessible, as mentioned earlier. The destination of the transfer device 12 in such access movement depends mainly upon the machining schedule, the circumstance and the like and may usually be directed to either one of the machine tools 1, 2, either one of the BLD-STs 6, 7 or either one of the PLD-STs 8, 9 which is vacant or not busy. Therefore, in the following description regarding the operation of the transfer device 12, it will not be described which of the machine tools 1, 2, the BLD-STs 6, 7 or the PLD-STs 8, 9 the transfer device 12 accesses for supply or collection of each pallet 21 or basket 22, 23.

The input section 103 enables the worker to input various kinds of information to be stored. The memory section 104 stores therein the information inputted by the worker at the input section 103. The memory section 104 stores blank material basket information and finished product basket information therein. The blank material basket information includes the kind and number of blank materials X presently contained in each blank material basket 22, the loading time at which each blank material basket 22 is first loaded from the system loading/unloading station (SLD-ST) 3 to the basket rack 4, and the like. The finished product information includes the kind and number of finished products Z presently contained in each finished product basket 23, the number of finished products Z which each finished product basket 23 is able to further receive therein, the time (initial receiving time) at which each finished product basket 23 first received one or more finished products Z therein, and the like. The memory section 104 also stores pallet information, that is, the kind and number of workpieces W to be attached to each pallet 21. The memory section 104 further stores therein correlation information which correlates the workpieces W to be attached to each pallet 21 with the blank materials X contained in each blank material basket 22. Besides, the memory section 104 stores therein transfer reservation information, basket location information showing the places such as the basket rack 4 where the blank material baskets 22 and the finished product baskets 23 stay in the system, and pallet location information showing the places such as the pallet rack 5 where the pallets 21 stay in the system.

The transfer reservation information is the information shown in FIG. 3 which is inputted by the worker at each of the temporary support tables 10, 11. More specifically, the transfer reservation information includes the kind and number of the workpieces W which are temporarily placed on each of the temporary support tables 10, 11, and transfer reservation numbers depending on the order in which the transfer reservations were inputted.

Figure 4:
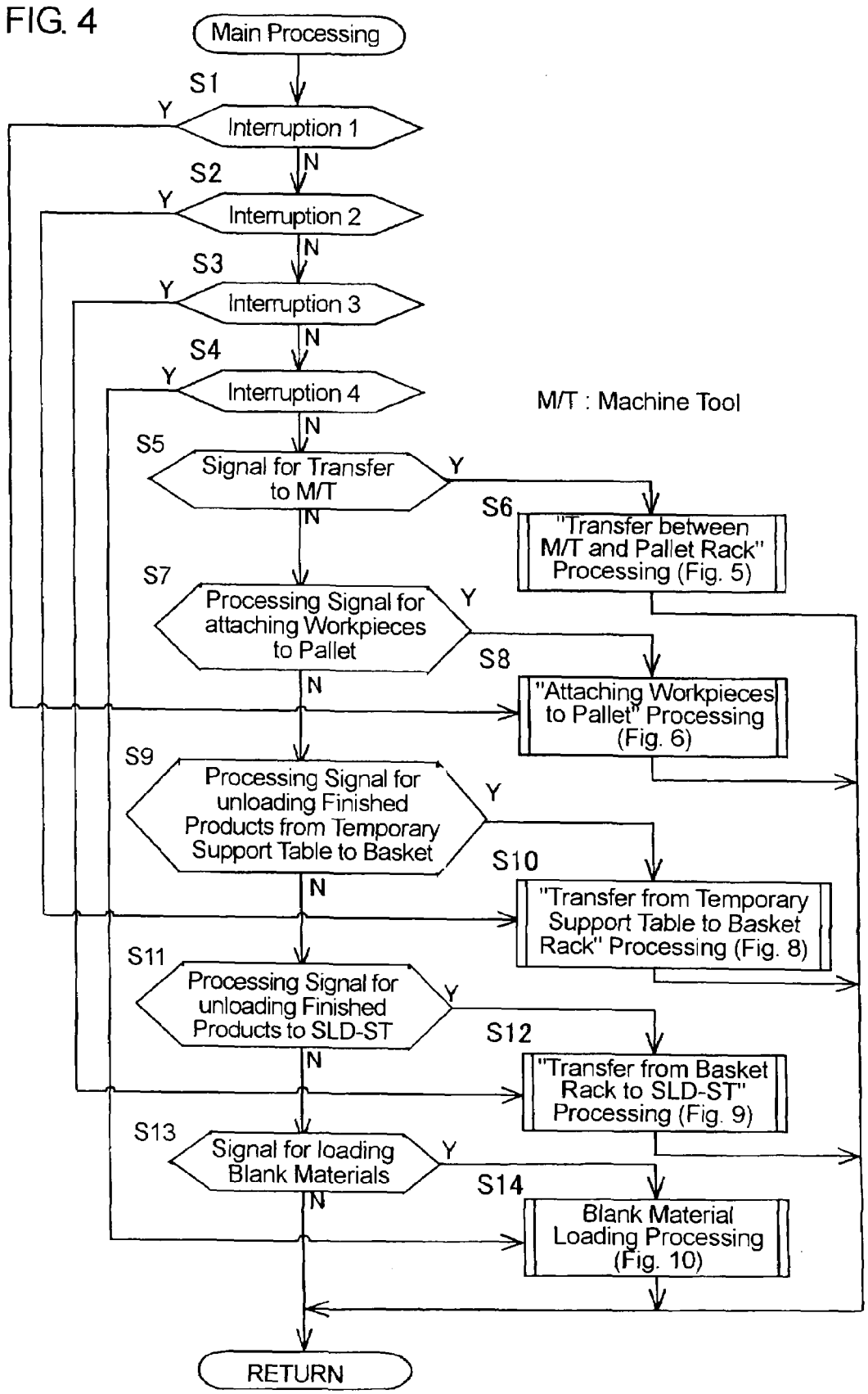
FIG. 4 is a flow chart showing a main processing of the control apparatus shown in FIG. 2.
Figure 5:
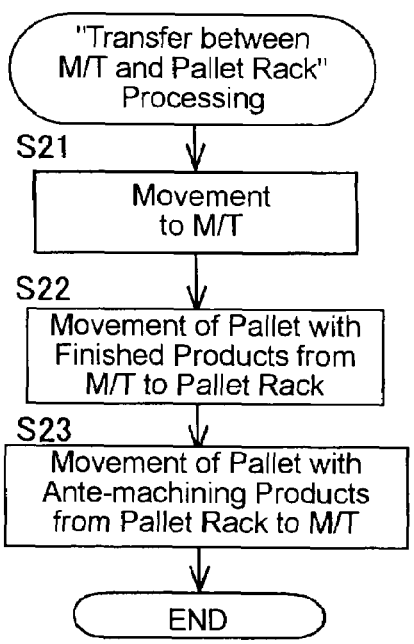
FIG. 5 is a flow chart showing a processing for transfer between machine tools and a pallet rack.
Figure 6:
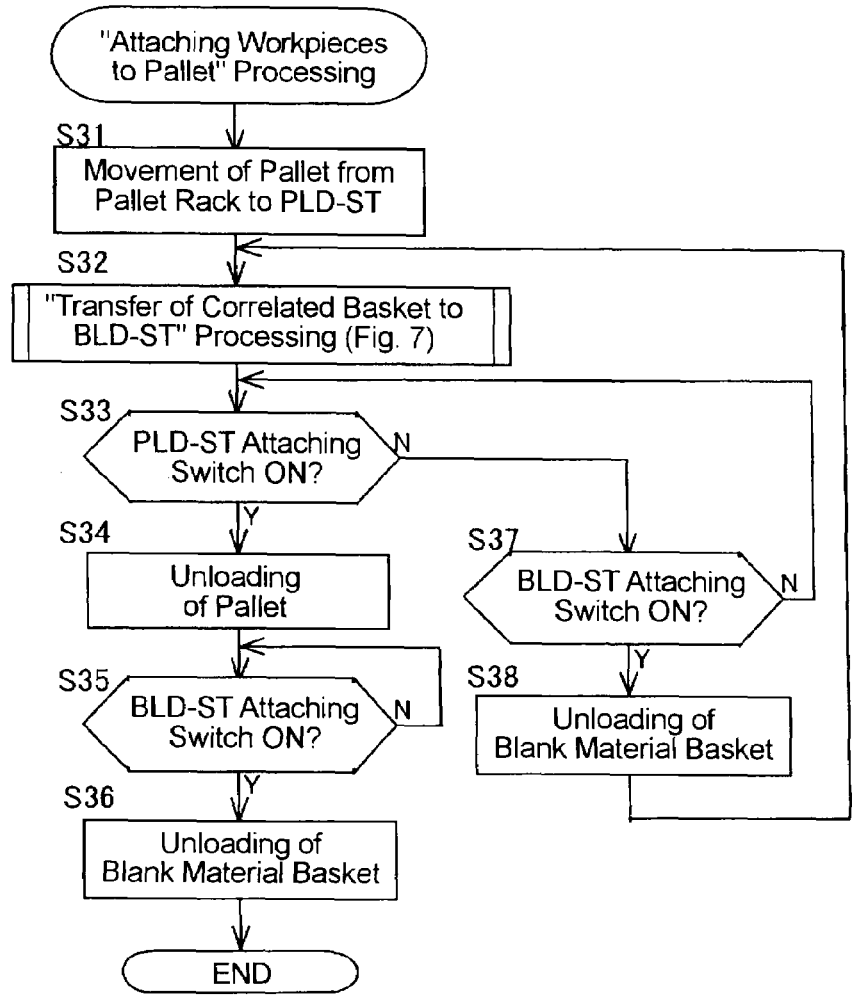
FIG. 6 is a flow chart showing a processing for attaching workpieces to a pallet.
Figure 7:
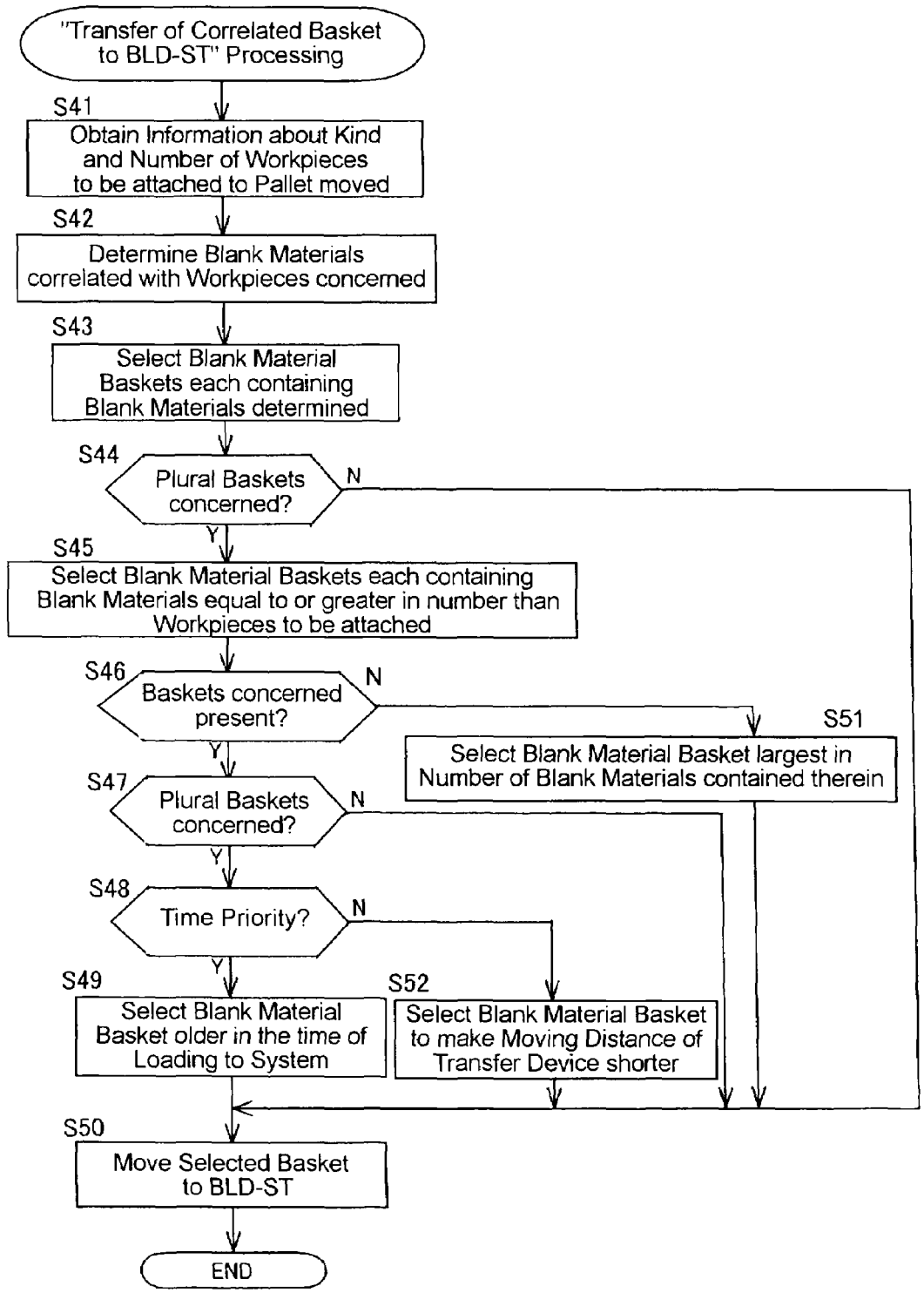
FIG. 7 is a flow chart showing a processing for transfer of a correlated basket to a basket loading station.
Figure 8:
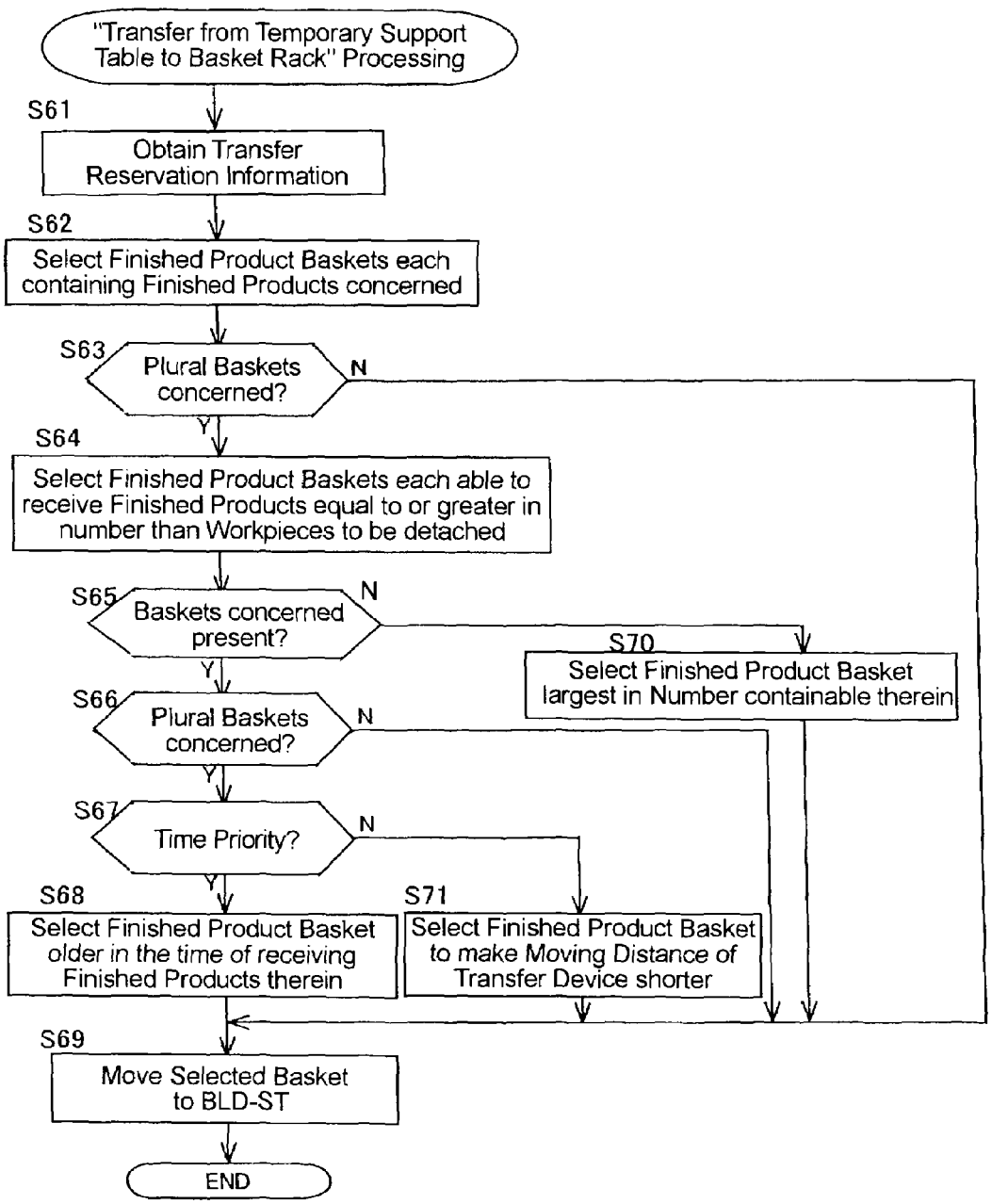
FIG. 8 is a flow chart showing a processing for transfer from temporary support tables to a basket rack.
Figure 9:
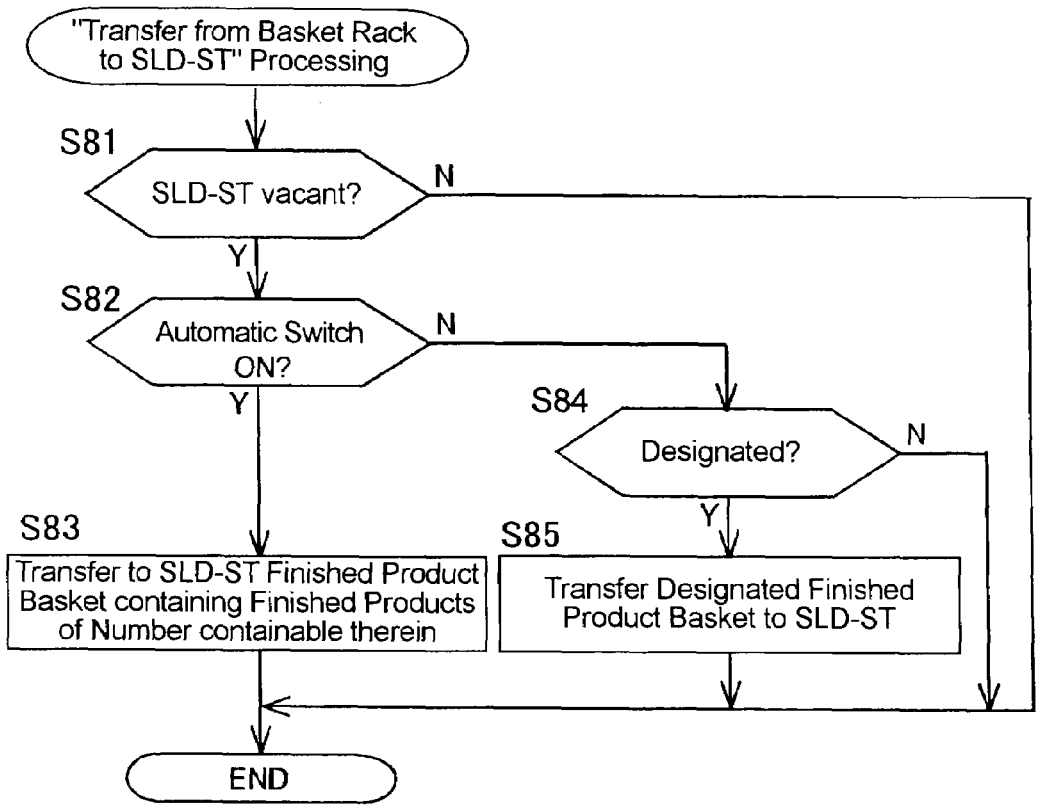
FIG. 9 is a flow chart showing a processing for transfer from the basket rack to a system loading station.
Figure 10:
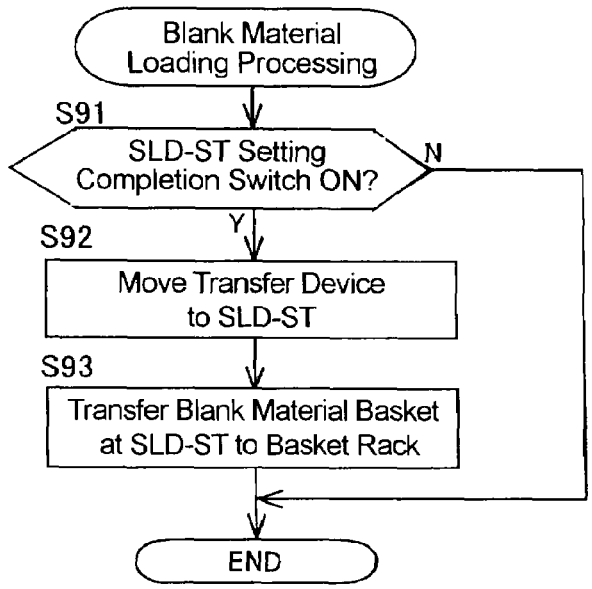
FIG. 10 is a flow chart showing a processing for loading blank materials.

Next, the processing of the transfer control section 102 will be described with reference to FIGS. 4 to 10. FIG. 4 is a flow chart showing a main processing of the control apparatus 100. FIG. 5 is a flow chart showing a processing for transfer between the machine tool 1, 2 and the pallet rack 5. FIG. 6 is a flow chart showing a processing for attaching workpieces W to each pallet 21. FIG. 7 is a flow chart showing a processing for transferring a correlated basket to the basket loading station (BLD-ST) 6, 7. FIG. 8 is a flow chart showing a processing for transfer from the temporary support table 10, 11 to the basket rack 4. FIG. 9 is a flow chart showing a processing for transfer from the basket rack 4 to the system loading/unloading station (SLD-ST) 3. FIG. 10 is a flow chart showing a processing for loading blank materials.

(Main Processing)

As shown in FIG. 4, in a general classification, the transfer control section 102 performs a "transfer between machine tool and pallet rack" processing, an "attaching workpieces to pallet" processing, a "transfer from temporary support table to basket rack" processing, a "transfer from basket rack to SLD-ST" processing, and a blank material loading processing.

First of all, when interruption 1 is inputted by the worker at the input section 103 (S1), the transfer control section 102 performs the "attaching workpieces to pallet" processing (S8) and terminates the main processing (Return). When interruption 2 is inputted (S2) with the interruption 1 being not inputted, the transfer control section 102 performs the "transfer from temporary support table to basket rack" processing (S10) and terminates the main processing. When interruption S3 is inputted (S3) with neither the interruption 1 nor the interruption 2 being inputted, the transfer control section 102 performs the "transfer from basket rack to SLD-ST" processing (S12) and then, terminates the main processing. When interruption 4 is inputted with none of the interruptions 1-3 being inputted, the transfer control section 102 performs the blank material loading processing (S14) and then, terminates the main processing.

An ordinary processing is executed while none of the interruptions 1-4 is being inputted. First of all, when a "transfer to machine tool" signal is inputted from the machine tools 1, 2 through the schedule managing section 101 (S5), the transfer control section 102 executes a "transfer between machine tool and pallet rack" processing (S6) and terminates the main processing. The "transfer between machine tool and pallet rack" processing includes a processing for transferring a pallet 21 from the machine tool 1, 2 to the pallet rack 5 when the machine tool 1, 2 forms finished products by completing the machining on the workpieces W attached to the pallet 21. It also includes a processing for transferring a pallet 21 which is placed on the pallet rack 5 with ante-machining workpieces W attached thereon, to the machine tool 1, 2. The details of the processing concerned will be described later.

Then, when not having the "transfer to machine tool" signal inputted from the schedule managing section 101, the transfer control section 102 judges whether it has inputted a processing signal for attaching workpieces to pallet, from the schedule managing section 101 (S7). If the processing signal for attaching workpieces to pallet is inputted, the transfer control section 102 executes the "attaching workpieces to pallet" processing (S8) and terminates the main processing. The details of the processing concerned will be described later.

Then, when not inputting the processing signal for attaching workpieces to pallet, from the schedule managing section 101, the transfer control section 102 judges whether it has inputted a processing signal for unloading finished products from temporary support table to finished product basket, from the schedule managing section 101 (S9). The transfer control section 102 executes the "transfer from temporary support table to basket rack" processing (S10) when inputting thereto the processing signal for unloading finished products from temporary support table to a finished product basket, and terminates the main processing. The details of the processing concerned will be described later.

Then, when not inputting thereto the processing signal for unloading finished products from temporary support table to finished product basket, the transfer control section 102 judges whether it has inputted a processing signal for unloading finished products to SLD-ST, from the schedule managing section 101 (S11). The transfer control section 102 executes the "transfer from basket rack to SLD-ST" processing when inputting the processing signal for unloading finished products to SLD-ST (S12), and terminates the main processing. The details of the processing concerned will be described later.

Then, when not inputting thereto the processing signal for unloading finished products to SLD-ST, from the schedule managing section 101, the transfer control section 102 judges whether it has inputted a processing signal for loading blank materials (S13). The transfer control section 102 executes the blank material loading processing when inputting thereto the processing signal for loading blank materials (S14), and terminates the main processing. The details of the processing concerned will be described later.

That is, as long as none of the interruptions 1-4 is inputted, the transfer control section 102 executes the "transfer between machine tool and pallet rack" processing, the "attaching workpieces to pallet" processing, the "transfer from temporary support table to basket rack" processing, the "transfer from basket rack to SLD-ST" processing, and the blank material loading processing in turn on the priority basis of this order.

("Transfer between machine Tool and Pallet Rack" Processing)

The "transfer between machine tool and pallet rack" processing will be described with reference to FIG. 5. As shown in FIG. 5, the transfer device 12 is moved to the machine tool 1, 2 which has formed finished products Z, (S21). Then, the pallet 21 with the finished product Z attached thereon is moved from the machine tool 1, 2 to the pallet rack 5 (S22). Then, another pallet 21 with workpieces W to be machined next (i.e., ante-machining products) is moved from the pallet rack 5 to the machine tool 1, 2 (S23).

("Attaching Workpieces to Pallet" Processing)

The "attaching workpieces to pallet" processing will be described with reference to FIGS. 6 and 7. First of all, as shown in FIG. 6, a pallet 21 which is to attach blank materials X thereon is moved from the pallet rack 5 to the pallet loading station (PLD-ST) 8, 9 (S31). Although it is often the case that finished products Z have been attached to the pallet 21, it may be the case that no workpiece has been attached thereto. If finished products Z have been attached to the pallet 21, the worker detaches the finished products Z from the pallet 21 at the PLD-ST 8, 9 and places the finished products Z on the temporary support table 10, 11. Further, the worker enters transfer reservation information about the kind and the number of the detached, finished products Z.

Then, a "transfer of correlated basket to BLD-ST" processing is executed (S32). This processing is the processing for determining blank materials X correlated with workpieces W which are to be attached to the pallet 21 having been moved to the PLD-ST 8, 9, and for moving a blank material basket 22 with the determined blank materials X contained therein, to the BLD-ST 6, 7. This processing corresponds to means or step of transferring "ante-machining product basket" in the claimed invention. The details of the processing concerned will be referred to later with reference to FIG. 7.

Then, a judgment is made of whether a PLD-ST attaching switch (not shown: a switch provided at each PLD-ST 8, 9) is turned to ON by the worker (S33). The worker turns the PLD-ST attaching switch to ON at the PLD-ST 8, 9 when the worker completes attaching to a pallet 21 all of blank materials X to be attached to the pallet 21. This information is inputted to the control apparatus 100 to be stored in the memory section 104. Then, when the PLD-ST attaching switch is turned to ON by the worker, the pallet 21 at the PLD-ST 8, 9 is unloaded to the pallet rack 5 (S34).

Then, a judgment is made of whether a BLD-ST attaching switch (not shown: a switch provided at each BLD-ST 6, 7) is turned to ON by the worker (S35). When wanting to unload a blank material basket 22 at the BLD-ST 6, 7 to the basket rack 4, the worker turns the BLD-ST attaching switch to ON. Here, since attaching all of blank materials X to the pallet 21 has been completed, the blank material basket 22 at the BLD-ST 6, 7 is unloaded to the basket rack 4. Accordingly, when the BLD-ST attaching switch is turned to ON by the worker, the blank material basket 22 at the BLD-ST 6, 7 is unloaded to the basket rack 4 (S36) and this routine is terminated. In this case, however, the unloading of the blank material basket 22 to the basket rack 4 is not carried out until the BLD-ST attaching switch is turned to ON by the worker.

If the situation occurs that no blank material is contained in a blank material basket 22 at the BLD-ST 6, 7 though the pallet 21 has not had all of blank materials X attached thereto, the worker instructs that another blank material basket 22 be transferred to the BLD-ST 6, 7. To this end, the worker turns the BLD-ST attaching switch to ON before turning the PLD-ST attaching switch to ON.

When the worker turns the BLD-ST attaching switch to ON at step S37 without turning the PLD-ST attaching switch to ON (S37), the transfer control section 100 controls the transfer device 12 to unload the blank material basket 22 at the BLD-ST 6, 7 to the basket rack 4 (S38). Thereafter, the "transfer of correlated basket to BLD-ST" processing is executed again at step S32. On the other hand, if the BLD-ST attaching switch is also not turned to ON at step S37, return is made to step S33 to repeat the processing.

Next, the "transfer of correlated basket to BLD-ST" processing at step S32 in FIG. 6 will be described with reference to FIG. 7. First of all, there is obtained information about the kind and number of the workpieces W which are to be attached to the pallet 21 moved to the PLD-ST 8, 9 (S41). Then, blank materials X correlated with the workpieces W are determined based on correlation information stored in the memory section 104 (S42). Then, selection is made for blank material baskets 22 each containing the determined blank materials X therein (S43).

Then, if the blank material baskets 22 selected at step S43 are not plural in number (No at S44), the blank material basket 22 selected at step S43 is moved to the BLD-ST 6, 7 (S50), and the processing is terminated. If the blank material baskets 22 selected at step S43 are plural in number (Yes at S44), on the other hand, blank material baskets 22 each containing the blank materials X which are equal to or greater in number than the workpieces W to be attached to the pallet 21 are further selected from the already selected blank material baskets 22 (S45).

Then, if the blank material baskets 22 selected at step S45 are confirmed (Yes at S46) and if the blank material baskets 22 are plural in number (Yes at S47), a judgment is made of whether the entry by the worker of time priority has been registered in advance or not (S48). The registration of the time priority can be made by using the input section 103 and is stored in the memory section 104.

Then, if the registration of the time priority has been made (Yes at S48), an older or earlier one in terms of the time at which it was loaded to the system is further selected from the plurality of blank material baskets 22 concerned (S49). Thereafter, the blank material basket 22 selected at step S49 is transferred to the BLD-ST 6, 7 (S50), and the processing is terminated.

On the other hand, if the registration of the time priority has not been made (No at S48), further selection is made for a blank material basket 22 which can make the moving distance of the transfer device 12 shorter (S52). Then, the selected blank material basket 22 is transferred to the BLD-ST 6, 7 (S50), and the processing is terminated.

Further, if one is confirmed as the number of the blank material baskets 22 each containing blank materials X which are equal to or greater in number than the workpieces W to be attached (No at S47), the blank material basket 22 selected at step S45 is transferred to the BLD-ST 6, 7 (S50), and the processing is terminated.

Further, if it is confirmed at step S46 that there is no blank material basket 22 containing blank materials X which are equal to or greater in number than the workpieces W to be attached (No at S46), selection is made for a blank material basket 22 which is the largest in the number of blank materials X contained therein (S51). Then, the selected blank material basket 22 is transferred to the BLD-ST 6, 7 (S50), and the processing is terminated.

("Transfer from Temporary Support Table to Basket Rack" Processing)

Next, the "transfer from temporary support table to basket rack" processing will be described with reference to FIG. 8. This processing corresponds to means or step of transferring "post-machining product basket" in the claimed invention. First of all, there is obtained transfer reservation information which has been stored in the memory section 104 (S61). Then, finished products 23 each with finished products Z contained therein are selected based on the transfer reservation information (S62).

Then, if the number of the finished product baskets 23 so selected is not plural (No at S63), the finished product basket 23 selected at step S62 is transferred to the BLD-ST 6, 7 (S69), and the processing is terminated. On the other hand, if the number of the finished product baskets 23 selected at step S62 is plural (Yes at S63), a finished product basket 23 which is able to further receive finished products Z of the number equal to or greater than the finished products Z having been temporarily placed on the temporary support table 10, 11 is selected from those finished product baskets 23 having been already selected.

Then, if the finished products 23 selected at step S64 are confirmed to be present (Yes at S65) and if the finished products 23 so selected are plural in number (Yes at S66), a judgment is made of whether the entry by the worker of time priority has been registered in advance or not (S67). The registration of the time priority can be made by using the input section 103 and is stored in the memory section 104.

Then, if the registration of the time priority has been made (Yes at S67), a finished product basket which is older or earlier in terms of the time at which one or more finished products were initially put thereinto is further selected from the plurality of finished product baskets 23 so selected (S68). Thereafter, the finished product basket 23 selected at step S68 is transferred to the BLD-ST 6, 7 (S69), and the processing is terminated.

On the other hand, if the registration of the time priority is not confirmed (No at S67), further selection is made for a finished product basket 23 which can make the moving distance of the transfer device 12 shorter (S71). Then, the selected finished product 23 is transferred to the BLD-ST 6, 7 (S69), and the processing is terminated.

Further, if one is confirmed as the number of the finished product baskets 23 each of which is able to further receive therein finished products Z of the number equal to or greater than the finished products Z temporarily placed on the temporary support table 10, 11 (No at S66), the finished product basket 23 selected at step S64 is transferred to the BLD-ST 6, 7 (S69), and the processing is terminated.

Further, if it is confirmed at step S65 that there is no finished product basket 23 which is able to further receive therein finished products Z of the number equal to or greater than the finished products Z temporarily placed on the temporary support table 10, 11 (No at S65), selection is made for a finished product basket 23 which is the largest in the number to further put finished products Z thereinto (S70). Then, the finished product basket 23 so selected is transferred to the BLD-ST 6, 7 (S69), and the processing is terminated.
("Transfer from Basket rack to SLD-ST" Processing)

Next, the "transfer from basket rack to SLD-ST" processing will be described with reference to FIG. 9. As shown in FIG. 9, this processing involves judging whether the system loading station (SLD-ST) 3 is vacant or not, that is, whether it is the state that neither a blank material basket 22 nor a finished product basket 23 occupies the SLD-ST 3 (S81). If the SLD-ST 3 is vacant (Yes at S81), a judgment is made of whether an automatic switch being a switch which is to instruct a processing for automatic unloading of a finished product basket 23 has been turned to ON or not (S82). If the automatic switch is ON, the finished product basket 23 which has contained the finished products Z up to those it can contain therein is transferred to the SLD-ST 3 (S83). Then, the processing is terminated, and the work unloads from the system (i.e., FMS) the finished product basket 23 now transferred to the SLD-ST 3.

On the other hand, if the automatic switch is not ON (No at S82), a judgment is made of whether a designation by the worker has been inputted or not (S84). Unless the designation has been inputted, the processing is terminated. If a designation by the worker has been inputted (Yes at S84), a finished product basket 23 so designated is transferred to the SLD-ST 3 (S85), and the processing is then terminated.
(Blank Material Loading Processing)

Next, the blank material loading processing will be described with reference to FIG. 10. As shown in FIG. 10, the processing involves judging whether the SLD-ST setting completion switch (not shown: a switch provided at the SLD-ST 3) has been turned to ON or not (S91). The worker turns the SLD-ST setting completion switch to ON when completing the preparation for loading a blank material basket 22.

Then, if the SLD-ST setting completion switch is ON, the transfer device 12 is moved to the SLD-ST 3 (S92) and transfers the blank material basket 22 placed on the SLD-ST 3 to the basket rack 4 (S94), and the processing is terminated. On the other hand, if the SLD-ST setting completion switch is not ON, the processing is terminated without executing such loading.
(Effects of First Embodiment)

According to the FMS described hereinabove, the control apparatus 100 stores therein the correlation of each workpiece W with a blank material X, and thus, it becomes possible to grasp the correlation of blank materials X with the workpieces W attached to the pallet 21. When the pallet 21 is transferred to the PLD-ST 8, 9, the control apparatus 100, by utilizing the correlation information, controls the transfer device 12 to transfer a blank material basket 22 having contained the blank materials X to be attached to the pallet 21, to the BLD-ST 6, 7 in connection with the transfer operation of the pallet 21. Thus, the worker is not required to search for the blank material basket 22. Therefore, it becomes possible to reduce the time which is taken by the worker to search for the blank material basket 22.

Further, the blank material basket 22 is transferred to the BLD-ST 6, 7 in connection with the operation for transferring the pallet 21 to the PLD-ST 8, 9. This can be realized by storing the correlation information in advance in the control apparatus 100. By the synchronized or connected operations, it becomes possible to further shorten the time period during which the pallet 21 is caused to wait at the PLD-ST 8, 9. Thanks to these advantages, it becomes possible to enhance the operational efficiency of the FMS.

Further, as long as no interruption is given by the worker, the "attaching workpieces to pallet" processing (corresponding to means or step of transferring "ante-machining product basket" in the claimed invention) is executed in preference to the "transfer from temporary support table to basket rack" processing (corresponding to means or step of transferring "post-machining product basket" in the claimed invention). Namely, even when a pallet 21 with finished products Z attached thereto is transferred to come to the PLD-ST 8, 9, attaching blank materials X to the pallet 21 is done in preference to moving the finished products Z into a finished product basket 23. Thus, the pallet 21 having attached the blank materials X is placed on the pallet rack 5 at an early stage, and hence, it becomes possible to execute the schedule management for the machine tools 1, 2 more reliably.

Further, as having been explained in the "transfer of correlated basket to BLD-ST" processing shown in FIG. 7, where a plurality of blank material baskets 22 all of which contain therein blank materials X of the same kind and where a plurality of workpieces W are to be attached to a pallet 21, a blank material basket 22 to be transferred to the BLD-ST 6, 7 is determined based on the number of the workpieces W to be attached and the respective numbers of the blank materials X contained in the respective blank material baskets 22. Thus, it becomes possible to decrease the number of transfer operations for the blank material basket 22.

Where a plurality of blank material baskets 22 are selected, it becomes possible in dependence on a setting by the worker to transfer a blank material basket which can make the moving distance of the transfer device 12 shorter or to transfer those blank material baskets 22 in turn in the order that one oldest in the loading time comes first. In the former case selected, the time period in the movement of the transfer device 12 can be shortened, while in the latter case selected, since the blank materials X put earlier into a blank material basket 22 can be subjected to machining earlier than those put later into another blank material basket 22, replacements of the blank materials can be ensured.

Further, as having been explained at the "transfer from temporary support table to basket rack" processing shown in FIG. 8, where a plurality of finished product baskets 23 all of which contain therein finished products Z of the same kind and where a plurality of finished products Z are detached from a pallet 21, a finished product basket 23 to be transferred to the BLD-ST 6, 7 is determined based on the number of the finished products Z so detached and the respective numbers of the finished products Z which the finished product baskets can further put thereinto. Thus, it becomes possible to decrease the number of transfer operations for the finished product baskets 23.

Where a plurality of finished product baskets 23 are selected, it becomes possible in dependence on a setting by the worker to transfer a finished product basket which can make the moving distance of the transfer device 12 shorter or to put those finished products Z into a finished product basket 23 which is oldest or earliest in the time of receiving a finished product Z first. In the former case selected, the time period in the movement of the transfer device 12 can be shortened, while in the latter case selected, since finished products 23 reach their containable limit numbers in turn in the order of being older in receiving a finished product Z first, the replacements of the finished product baskets 23 can be ensured.

Further, by the provision of the temporary support tables 10, 11 and by the utilization of the transfer reservation information, it can be done to put finished products Z temporarily placed on the temporary support table 10, 11 into a finished product basket 23 by utilizing the unscheduled time of the transfer device 12. Therefore, it becomes possible to prevent the FMS from going down in the operational efficiency.

In the foregoing first embodiment, for higher efficiency in attaching workpieces W, a blank material basket 22 containing blank materials of the number equal to or greater than workpieces W to be attached to a pallet 21 is transferred on a priority basis to the basket loading station (BLD-ST) 6, 7. The present invention is not limited to this way of controlling the FMS. In terms of suppressing the stay in the FMS of those blank materials X which are older in the time of being loaded into the FMS, a blank material basket 22 containing those blank materials X which are older in the time of being loaded into the FMS may be transferred to the BLD-ST 6, 7 in preference to a blank material basket 22 containing blank materials X of the number equal to or greater than the workpieces W to be attached to a pallet 21.

(Second Embodiment)

The FMS in a second embodiment is on the premise that blank materials are first put into a blank material basket, that semimanufactured goods or products which are the blank materials having been partly machined are put into a semimanufactured product basket, and that finished products which have been finished from the blank materials or semimanufactured products are finally put in a finished product basket. Thus, the blank materials remain attached to a pallet until they are machined to semimanufactured products, and such semimanufactured products also remain attached to the same or another pallet until they are machined to finished products. That is, the baskets used there comprise blank material baskets, semimanufactured product baskets and finished product baskets of three kinds, which exist independently.

The FMS in the second embodiment differs from that in the first embodiment mainly in a respect of being provided with such semimanufactured product baskets. Figures which relate to or illustrate the second embodiment are FIGS. 1, 4-10, and 11-12. Hereafter, with reference to FIGS. 11 and 12, description will be made with the focus on primary differences from the foregoing first embodiment.

As shown in FIG. 11, a control apparatus 200 has a memory section 204 which differs from the memory section 104 in the foregoing first embodiment. In the memory section 204, semimanufactured product basket information is stored in addition to information as stored in the memory section 104 in the foregoing first embodiment. The information on each semimanufactured product basket includes the kind and number of semimanufactured products contained presently and a time (initial receiving time) when semimanufactured products are first put into the semimanufactured product basket being empty.

Further, correlation information stored in the memory section 204 includes information for correlating workpieces W with the semimanufactured products Y contained in each semimanufactured product basket, in addition to the aforementioned information for correlating the workpieces W with blank materials X.

Further, transfer reservation information stored in the memory section 204 further includes machining progress statuses regarding the workpieces W, as shown in FIG. 12. The machining progress status is meant to distinguish a semimanufactured product status from a finished product status.

In this particular embodiment, blank materials contained in each blank material basket and semimanufactured products contained in each semimanufactured product basket are regarded as ante-machining products. On the other hand, finished products contained in each finished product basket and semimanufactured products contained in each semimanufactured product basket are regarded as post-machining products. Here, the semimanufactured products encompass both of ante-machining products and post-machining products. This is because the semimanufactured products can be grasped as ante-machining products in light of the semimanufactured products to be machined subsequently, but as post-machining products in light of the semimanufactured products having completed a certain (but not final) step of machining.

The processing in the second embodiment is the same as the processing in the foregoing first embodiment except that the blank materials and the finished products in the foregoing first embodiment are replaced respectively as ante-machining products and post-machining products. Namely, regarding the machining order of workpieces W which order is determined by the schedule managing section 101, the information on the workpieces before machining is intend to represent either blank materials or semimanufactured products.

Therefore, the second embodiment which employs the semimanufactured product baskets can accomplish the same advantages as in the foregoing first embodiment.

(Modifications of First and Second Embodiments)

In the first and second embodiments, different baskets are used in dependence on the states of machining progress. Besides this, each basket may be used to put therein those different in the states of machining progress. Namely, in a modified form of the first embodiment, each blank material basket and each finished product basket may be commonly used without distinction therebetween. In a modified form of the second embodiment, each blank material basket, each semimanufactured product basket and each finished product basket may be commonly used without distinction therebetween. In this latter case, care must be taken for the worker in moving any blank materials or semimanufactured products from a basket to a pallet.

(Third Embodiment)

The FMS in a third embodiment is on the premise that blank materials X are first put into a blank material basket, that semimanufactured goods or products Y which are the blank materials X having been partly machined are put into a semimanufactured product basket, and that finally, finished products Z which have been finished from the blank materials X or the semimanufactured products Y are put into a finished product basket. Thus, blank materials X remain attached to a pallet until they are machined to semimanufactured products Y, and such semimanufactured products also remain attached to the same or another pallet until they are machined to finished products Z. Further, a plurality of blank materials X are controlled as one group. Group information defining one group is information that defines as one group a lot which is taken as a manufacturing unit of products. In this embodiment, the baskets used there comprise blank material baskets, semimanufactured product baskets and finished product baskets which exist independently.

Figures which relate to and illustrate the third embodiment are FIGS. 1, 4, 9-11, and 13-17. FIGS. 1, 4 and 9-10 are common to the foregoing first embodiment, FIG. 11 is common to the foregoing second embodiment, while FIGS. 13-17 are figures peculiar to the third embodiment. Hereafter, with reference to FIGS. 13-17, description will be made with the focus on primary differences from the foregoing first and second embodiments.

Like the second embodiment, the memory section 204 (shown in FIG. 11) of the control apparatus 200 in the third embodiment contains blank material basket information, semimanufactured product basket information, finished product basket information, pallet information and correlation information.

The information on each blank material basket includes a lot number in addition to the kinds and number of the blank materials X being presently contained, and the time at which each blank material basket 22 is first loaded into the system from the system loading/unloading station (SLD-ST) 3 for storage on the basket rack 4. The lot number is a part of the group information that defines as one group a lot being a manufacturing unit of products. An identical lot number is assigned to blank materials X in the same lot.

The information on each semimanufactured product basket includes a lot number in addition to the kind and number of the semimanufactured products Y presently contained, and the time (initial receiving time) at which the semimanufactured products are first put into each such semimanufactured product basket. A lot number included in the information on each semimanufactured product basket is information corresponding to the lot number included in the information on a blank material basket associated with each such semimanufactured product basket.

The information on each finished product basket includes a lot number in addition to the kind and number of the finished products presently contained, and the time (initial receiving time) at which the finished products are first put into each such finished product basket. A lot number included in the information on each finished product basket is information corresponding to the lot number included in the information on a blank material basket associated with each such finished product basket.

Further, the pallet information includes the kind, machining progress status and number of workpieces W to be attached to each pallet 21 and additionally includes the lot number of the workpieces W concerned. A lot number included in the pallet information on each pallet 21 is information corresponding to the lot number included in the information on a blank material basket containing the blank materials X to be attached as the workpieces W to each such pallet 21.

The correlation information includes information for correlating workpieces W with semimanufactured products Y contained in each semimanufactured product basket, in addition to information for correlating the workpieces W with corresponding blank materials X.

Further, as shown in FIG. 13, the transfer reservation information includes reservation order (reservation numbers), the kind of the workpieces temporarily placed on each temporary support table 10, 11, the lot number of the workpieces, the machining progress status of the workpieces and the number of the workpieces.

("Transfer between Machine Tool and Pallet Rack" Processing)

Figure 14:
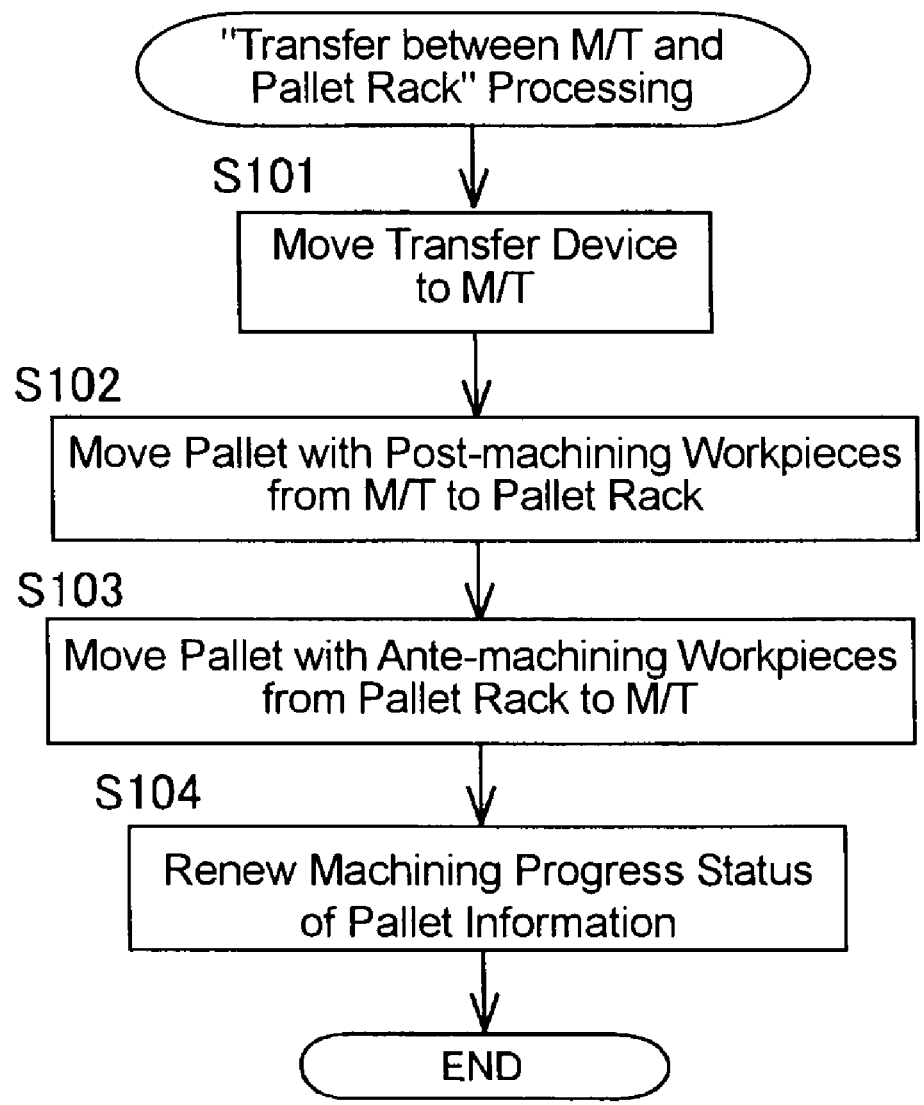
FIG. 14 is a flow chart showing a processing for transfer between the machine tools and the pallet rack in the third embodiment.

Next, a "transfer between machine tool and pallet rack" processing in the third embodiment will be described with reference to FIG. 14. As shown in FIG. 14, first of all, the transfer device 12 is moved to the machine tool 1, 2 in which finished products Z or semimanufactured products Y have been machined (S101). Then, the pallet 21 with the finish products Z or the semimanufactured products Y remaining attached thereto after machining is moved from the machine tool 1, 2 to the pallet rack 5 (S102). Then, a pallet 21 with workpieces W to be machined next is moved from the pallet rack 5 to the machine tool 1, 2 (S103). Then, alteration is made regarding the machining progress status of the pallet information for the pallet 21 to which the finish products Z or the semimanufactured products Y after machining remain attached and which has just been returned from the machine tool 1, 2 (S104).

For example, where the semimanufactured products Y have just machined from blank materials X in the machine tool 1, 2, the processing at step S104 is as follows. Before the machining, symbol "X" representing blank materials X has been stored as the machining progress status of the pallet information about the pallet 21 concerned. After the machining, at step S104, the machining progress status of the pallet information on the pallet 21 concerned is altered to symbol "Y" representing semimanufactured products Y.

Further, where the finished products Z have just been machined from the semimanufactured products Y in the machine tool 1, 2, the processing at step S104 is as follows. Before the machining, symbol "Y" representing the semimanufactured products Y has been stored as the machining progress status of the pallet information on the pallet 21 concerned. After the machining, at step S104, the machining progress status of the pallet information on the pallet 21 concerned is altered to symbol "Z" representing finished products Z.

("Attaching Workpieces to Pallet" Processing)

Figure 15:
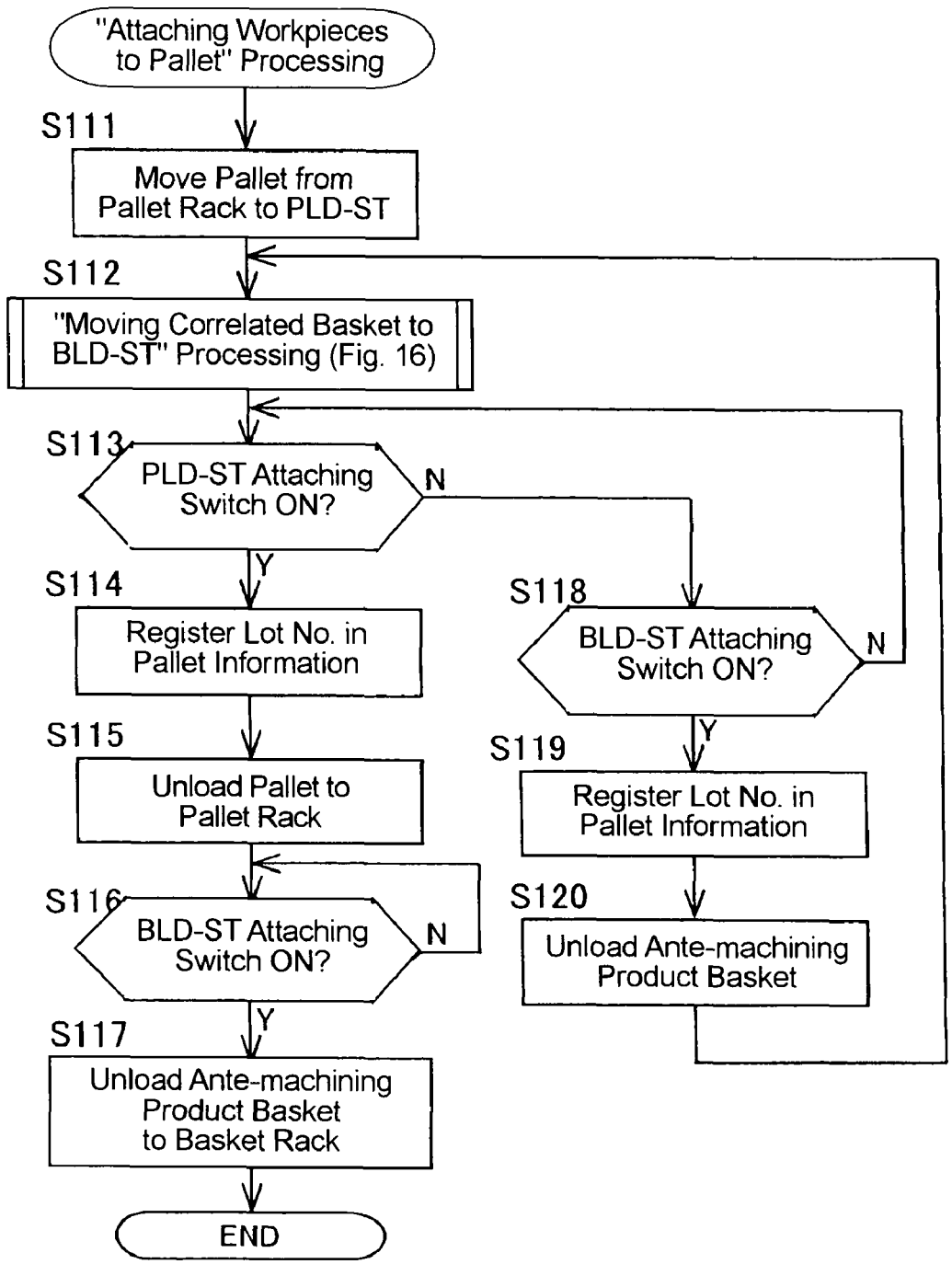
FIG. 15 is a flow chart showing a processing for attaching workpieces to a pallet in the third embodiment.
Figure 16:
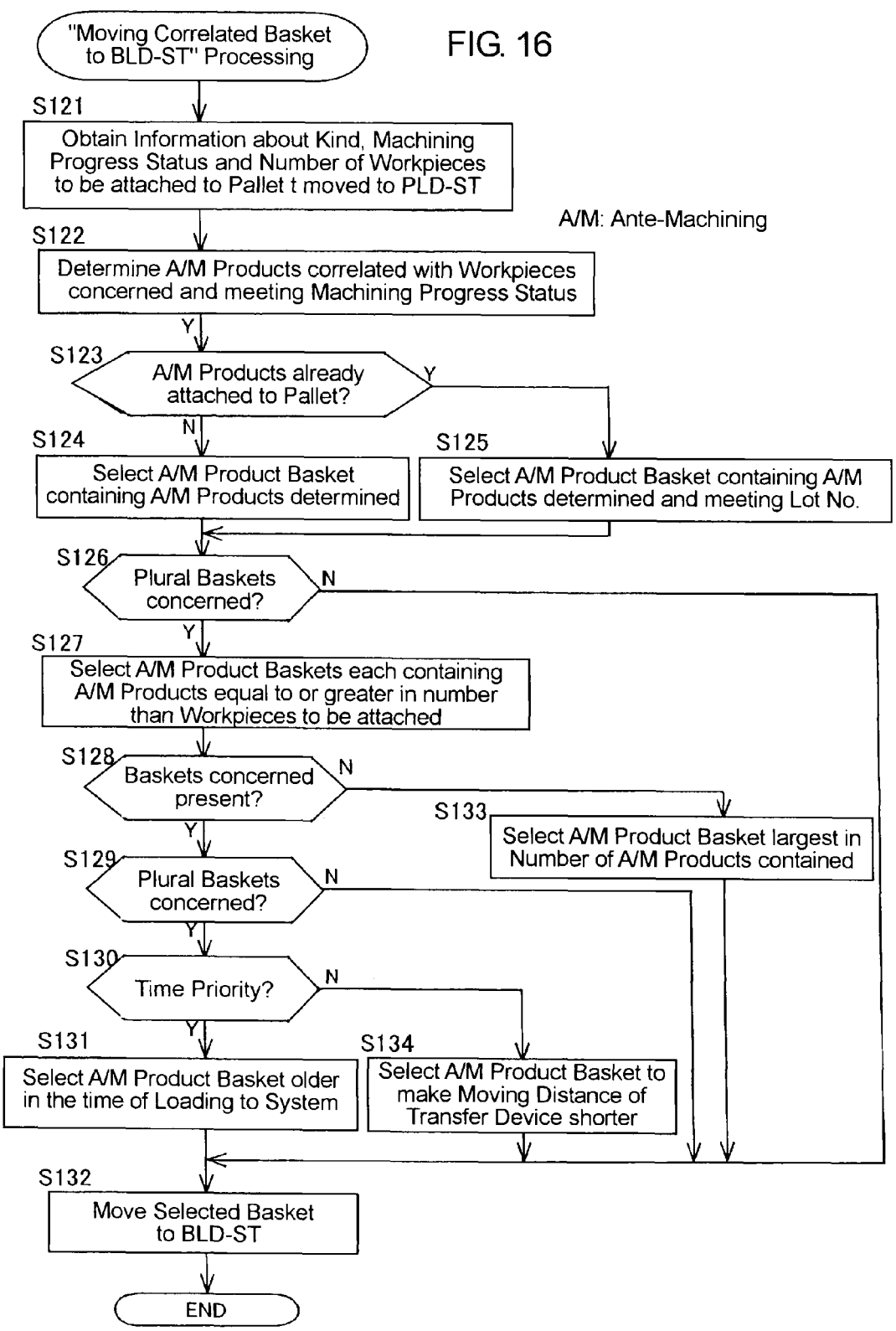
FIG. 16 is a flow chart showing a processing for moving a correlated basket to the basket loading station in the third embodiment.

An "attaching workpieces to pallet" processing in the third embodiment will be described with reference to FIGS. 15 and 16. As shown in FIG. 15, first of all, a pallet 21 to which ante-machining products (blank materials X or semimanufactured products Y) are to be attached is moved from the pallet rack 5 to the pallet loading station (PLD-ST) 8, 9 (S111). Although it is often the case that the pallet 21 has already attached thereto post-machining products (finished products Z or semimanufactured products Y), it may be the case that no workpiece W has been attached thereto. If it is the case that the pallet 21 has already attached thereto post-machining products (finished products Z or semimanufactured products Y), the worker detaches the post-machining products (finished products Z or semimanufactured products Y) from the pallet 21 at the PLD-ST 8, 9 and places the post-machining products on the temporary support table 10, 11. Further, the worker enters transfer reservation information including the kind, lot number, machining progress status and number of the detached post-machining products (finished products Z or semimanufactured products Y).

Then, a "moving correlated basket to BLD-ST" processing is executed (S112). This processing is a processing for determining ante-machining products (blank materials X or semimanufactured products Y) correlated with workpieces W which are to be attached to a pallet 21 having been moved to the PLD-ST 8, 9 and for moving to the BLD-ST 6, 7 a blank material basket 22 or a semimanufactured product basket (not shown) containing the determined ante-machining products (blank materials X or semimanufactured products Y). This processing corresponds to means or step of transferring "ante-machining product basket" in the claimed invention. The details of this processing will be described later with reference to FIG. 16.

Then, a judgment is made of whether or not the PLD-ST attaching switch (not shown) is turned into ON by the worker (S113). The worker turns the PLD-ST attaching switch into ON when completing attaching all of ante-machining products (blank materials X or semimanufactured products Y) onto the pallet 21 at the PLD-ST 8, 9. This information is inputted into the control apparatus 200 and is stored in the memory section 204. Then, when the PLD-ST attaching switch is turned into ON by the worker, a lot number is added to the pallet information on the pallet 21 concerned (S114). The lot number is the lot number which is included in the basket information on the basket in which the blank materials X or semimanufactured products Y having now attached to the pallet 21 were contained.

Then, the pallet 21 at the PLD-ST 8, 9 is unloaded to the pallet rack 5 (S115).

Then, a judgment is made of whether or not the BLD-ST attaching switch (not shown) is turned into ON by the worker (S116). The worker turns the BLD-ST attaching switch into ON when wanting to unload the blank material basket 22 or the semimanufactured product basket at the BLD-ST 6, 7 to the basket rack 4. Here, since attaching all of the ante-machining products (blank materials X or semimanufactured products Y) onto the pallet 21 has been completed, the blank material basket 22 or the semimanufactured product basket at the BLD-ST 6, 7 should be unloaded to the basket rack 4. Accordingly, when the BLD-ST attaching switch is turned into ON by the worker, the blank material basket 22 or the semimanufactured product basket at the BLD-ST 6, 7 is unloaded to the basket rack 4 (S117), and the processing is terminated. It is to be noted that the unloading of the blank material basket 22 or the semimanufactured product basket to the basket rack 4 is not carried out until the BLD-ST attaching switch is turned into ON by the worker.

Here, when a situation arises that no ante-machining product (blank material X or semimanufactured product Y) remains in the blank material basket 22 or the semimanufactured product basket though attaching all of the ante-machining products (blank materials X or semimanufactured products Y) onto the pallet 21 has not been completed yet, the worker instructs that another blank material basket 22 or another semimanufactured product basket be transferred to the BLD-ST 6, 7. Concretely, the worker turns the BLD-ST attaching switch into ON before turning the PLD-ST attaching switch into ON.

When the worker turns the BLD-ST attaching switch into ON without turning the PLD-ST attaching switch into ON in this way (S118), it is done first of all to store a lot number in the pallet information on the pallet 21 concerned (S119). This lot number is the lot number which is included in the basket information on the basket in which the blank materials X or semimanufactured products Y having now attached to the pallet 21 were contained.

Then, the transfer control section 102 operates to unload the blank material basket 22 or the semimanufactured product basket at the BLD-ST 6, 7 to the basket rack 4 (S120). Then, the "moving correlated basket to BLD-ST" processing at step S112 is again executed. If the BLD-ST attaching switch is not turned into ON at step S118, on the other hand, return is made again to step S113 to repeat the foregoing processing.

Next, the "moving correlated basket to BLD-ST" processing at step S112 in FIG. 15 will be described with reference to FIG. 16. First of all, there is obtained information about the kind, machining progress status and number of the workpieces W which are to be attached to the pallet 21 moved to the PLD-ST 8, 9 (S121). Then, ante-machining products (blank materials X or semimanufactured products Y) which are correlated with the workpieces W concerned and whose machining progress status coincides with that of the workpieces W concerned is determined based on the correlation information stored in the memory section 204 (S122).

Then, a judgment is made of whether the ante-machining products (blank materials X or semimanufactured products Y) have already been attached to the pallet 21 or not (S123). The situation that the ante-machining products have already been attached to the pallet 21 arises where the processing at the step S112 is again executed after the processing at step S120 in FIG. 15 is terminated once.

If the ante-machining products have not been attached to the pallet 21 yet, selection is made for a blank material basket 22 or a semimanufactured product basket containing the ante-machining products so determined (S124). If the ante-machining products have already been attached to the pallet 21, selection is made for a blank material basket 22 or a semimanufactured product basket which contains the ante-machining products so determined and which has assigned thereto the same lot number as the lot number being included in the pallet information on the pallet concerned (S125).

Then, if the blank material basket 22 or the semimanufactured product basket selected at step S124 or S125 is not plural (No at S126), the blank material basket 22 or the semimanufactured product basket selected at step S124 or S125 is moved to the BLD-ST 6, 7 (S132), and the processing is terminated. If those selected at step S124 or S124 are a plurality of blank material baskets 22 or semimanufactured product baskets (Yes at S126), on the contrary, blank material baskets 22 or semimanufactured product baskets each containing the ante-machining products (blank materials X or semimanufactured products Y) which are equal to or greater in number than the workpieces W to be attached to the pallet 21 are further selected from the already selected blank material baskets 22 or semimanufactured product baskets (S127).

Then, if the blank material baskets 22 or the semimanufactured product baskets are confirmed to be present (Yes at S128) and if having been selected are a plurality of blank material baskets 22 concerned or a plurality of semimanufactured product baskets concerned (Yes at S129), it is judged whether or not "time priority" has been registered by the worker (S130). The registration of the time priority is made at the input section 103 of the control apparatus 200 and is stored in the memory section 204.

Then, if the registration of the time priority has been made (Yes at S130), one which is oldest or earliest in the time of being loaded into the system is selected from the blank material baskets 22 concerned or the semimanufactured product baskets concerned (S131). Thereafter, the blank material basket 22 or the semimanufactured product basket selected at step S131 is moved to the BLD-ST 6, 7 (S132), and the processing is terminated.

If it is judged at S130 that no time priority has been registered (No at S130), on the contrary, there is selected one which can make the traveling distance of the transfer device 12 shorter (S134). Then, the blank material basket 22 or the semimanufactured product basket so selected is moved to the BLD-ST 6, 7 (S132), and the processing is terminated.

Further, if the blank material basket 22 or semimanufactured product basket containing ante-machining products (blank materials X or semimanufactured products Y) of the number equal to or greater than the workpieces W to be attached is judged to be one only at S129 (No at S129), the blank material basket 22 or the semimanufactured product basket selected at step S127 is moved to the BLD-ST 6, 7 (S132), and the processing is terminated.

Further, if at step S128, the blank material basket 22 or semimanufactured product basket containing ante-machining products (blank materials X or semimanufactured products Y) of the number equal to or greater than the workpieces W to be attached is not confirmed to be present (No at S128), there is selected a blank material basket 22 or a semimanufactured product basket which is largest in the number of ante-machining products (blank materials X or semimanufactured products Y) contained therein (S133). Then, the blank material basket 22 or semimanufactured product basket so selected is moved to the BLD-ST 6, 7 (S132), and the processing is terminated.

("Transfer from Temporary Support Table to Basket Rack" Processing)

Next, a "transfer from temporary support table to basket rack" processing in the third embodiment will be described with reference to FIG. 17. This processing corresponds to means or step of transferring "post-machining product basket" in the claimed invention. First of all, there is obtained transfer reservation information which has been stored in the memory section 204 of the control apparatus 200 (S141). Then, finished product baskets 23 or semimanufactured product baskets each containing post-machining products (finished products Z or semimanufactured products Y) are selected based on the transfer reservation information (S142). Concretely, the baskets are selected that contains the post-machining products (finished products Z or semimanufactured products Y) which have the kind of workpieces, lot number and machining progress status coinciding with those included in the obtained transfer reservation information.

Then, if it is confirmed that a plurality of selected finished products 23 or semimanufactured product baskets have not been selected (No at S143), the finished product basket 23 or semimanufactured product basket selected at step S142 is moved to the BLD-ST 6, 7 (S149), and the processing is terminated. If it is confirmed that the plurality of finished product baskets 23 or semimanufactured product baskets have been selected at step S142 (Yes at S143), on the contrary, there are further selected finished product baskets 23 or semimanufactured product baskets each of which is able to receive post-machining products (finished products Z or semimanufactured products Y) of the number equal to or greater than the post-machining products (finished products Z or semimanufactured products Y) placed temporarily on the temporary support table 10, 11 (S144).

Then, if the finished product baskets 23 or the semimanufactured product baskets are confirmed to be present (Yes at S145) and if having been selected are a plurality of finished product baskets 23 or a plurality of semimanufactured product baskets (Yes at S146), it is judged whether or not "time priority" has been registered in advance by the worker (S147). The registration of the time priority is made at the input section 103 of the control apparatus 200 and is stored in the memory section 204.

Then, if the registration of the time priority has been made (Yes at S147), one which is oldest or earliest in the time at which it first received finished products Z or semimanufactured products Y is selected from the finished product baskets 23 concerned or the semimanufactured product baskets concerned (S148). Thereafter, the finished product basket 23 or the semimanufactured product basket selected at step S148 is moved to the BLD-ST 6, 7 (S149), and the processing is terminated.

If it is judged at S147 that no time priority has been registered (No at S147), on the contrary, there is selected one which can make the traveling distance of the transfer device 12 shorter (S151). Then, the finished product 23 or semi-manufactured product basket so selected is moved to the BLD-ST 6, 7 (S149), and the processing is terminated.

Further, at step S146, it is judged to be only one finished product basket 23 or semimanufactured product basket that is able to contain post-machining products (finished products Z or semimanufactured products Y) of the number equal to or greater than the post-machining products (finished products Z or semimanufactured products Y) placed temporarily on the temporary support table 10, 11 (No at S146), the finished product basket 23 or semimanufactured product basket selected at step S144 is moved to the BLD-ST 6, 7 (S149), and the processing is terminated.

Further, if at step S145, the finished product basket 23 or semimanufactured product basket that is able to receive post-machining products (finished products Z or semimanufactured products Y) of the number equal to or greater than the post-machining products (finished products Z or semimanufactured products Y) supported temporarily on the temporary support table 10, 11 is not confirmed to be present (No at S145), there is selected a finished product basket 23 or semi-manufactured product basket which is largest in the number of post-machining products (finished products Z or semimanufactured products Y) containable therein (S150). Then, the finished product basket 23 or semimanufactured product basket so selected is moved to the BLD-ST 6, 7 (S149), and the processing is terminated.

(Effects of Third Embodiment)

In the third embodiment, a basket for containing post-machining products Y, Z is transferred to the BLD-ST 6, 7 on the basis of the lot number of ante-machining products X, Y, the lot number of the workpieces W and the lot number of the post-machining products Y, Z. Thus, the worker is able to put into the basket the post-machining products Y, Z all of which coincide in lot number. Accordingly, the worker (user) can control a plurality of post-machining products Y, Z as lot. As a result, it becomes possible to make a lot-basis control in the event that defectives are produced, for example.

Further, because the lot number (corresponding to "lot information" in the claimed invention) for performing the lot-basis control is included in respective basket information and respective pallet information, it becomes possible to make the lot-basis control easily and reliably.

Further, in the third embodiment, each blank material basket 22, each finished product basket 23 and each semimanufactured product basket are assigned as different baskets. This prevents those different in the status of machining progress from being mixed in each basket, so that it can be done to easily control and grasp blank materials X, semimanufactured products Y and finished products Z.

(Fourth Embodiment)

The outline of the FMS in the fourth embodiment will be described with reference to FIG. 18. The present system is on the premise that blank materials X, semimanufactured products Y and finished products Z are put into the same basket 420. In an example shown in FIG. 18, ten blank materials X are put into a certain basket 420 in the beginning. Then, two semimanufactured products Y which are made by machining two blank materials X of the ten are put into the same basket 420. It results at this time that as shown at the second stage of FIG. 18, eight blank materials X and two semimanufactured products have been contained in the basket 420. Then, two finished products Z which are made by further machining the two semimanufactured products Y and another two semi-manufactured products Y which are made by machining another two blank materials X of the ten are put into the same basket 420. It results at this time that the basket 420 has contained therein six blank materials X, two semimanufactured products Y and two finished products Z, as shown at the third stage of FIG. 18.

By further continuing the machining, it results finally that the basket 420 contains ten finished products Z therein. Here, the ten finished products Z are those obtained by machining the ten blank materials X which were first put into the basket 420. Further, in the mid course of the process, the semimanufactured products Y are also those obtained by machining the blank materials X which were first put into the basket 420. As described above, the predetermined basket 420 contains therein the blank materials X which were received first, and the semimanufactured products Y or the finished products Z which were obtained by subsequently machining the blank materials X.

That is, like the third embodiment, a plurality of blank materials X are controlled as a group also in the fourth embodiment. However, it should be noted that in the fourth embodiment, the lot information for defining each group is the information that identifies as one group a plurality of blank materials X contained in each basket 420. Further, in this particular embodiment, each common basket is used to serve as blank material basket, semimanufactured product basket and finished product basket for each group.

The figures which relate to and illustrate the fourth embodiment are FIGS. 1, 4, 9-10, 14 and 18-23. FIGS. 1, 4 and 9-10 are common to the first embodiment, FIG. 14 is common to the third embodiment, and FIGS. 18-23 are the figures peculiar to the fourth embodiment. Hereafter, with reference to FIGS. 18-23, description will be made with focus on the main differences from the first and second embodiments.

Figures 19, 20:
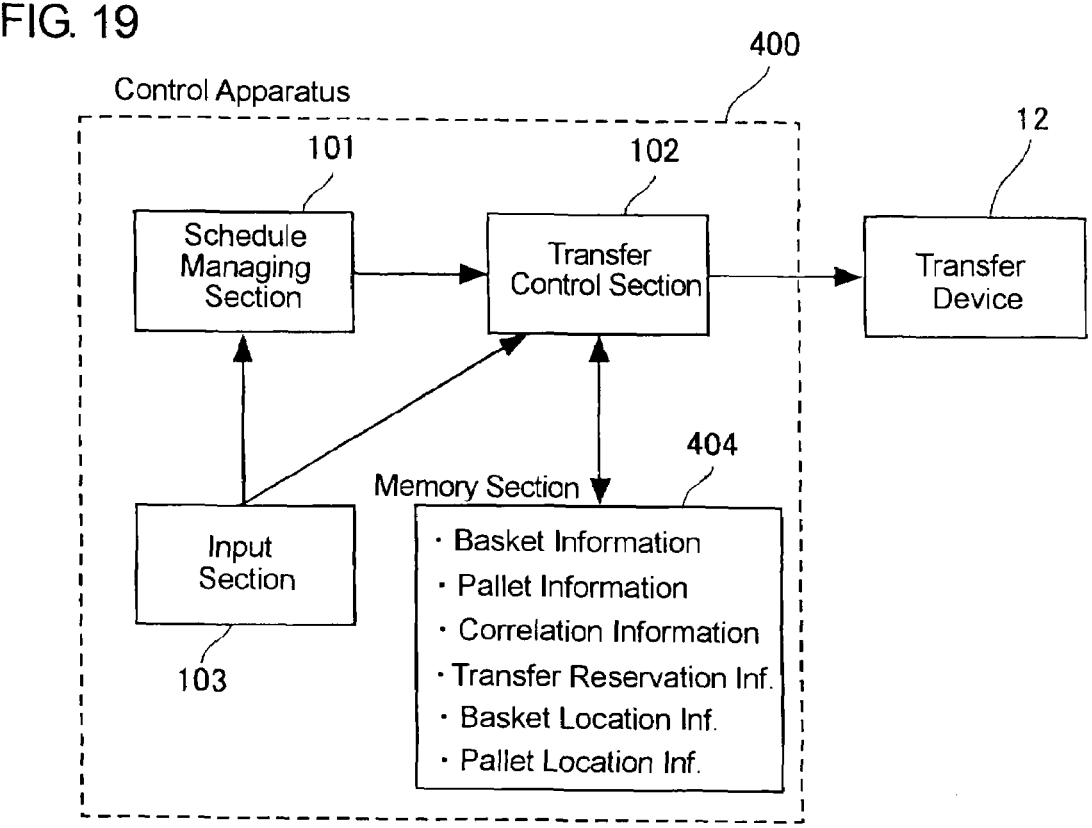
FIG. 19 is a block diagram showing the functional configuration of a control apparatus of the flexible manufacturing system in the fourth embodiment.
FIG. 20 is an explanatory view for explaining transfer reservation information in the fourth embodiment.

As shown in FIG. 19, a control apparatus 400 has a memory section 404 which differs from the memory section 104 in the first embodiment. The memory section 404 stores therein basket information, pallet information, correlation information, transfer reservation information, basket location information and pallet location information.

The basket information includes the kind and respective numbers of the blank materials X, the semimanufactured products Y and the finished products Z which are presently stored in each basket 420. The pallet information includes a basket number in addition to the kind and number of the workpieces W to be attached to each pallet 21. The basket number is information peculiar to each basket 420. The basket number is the information that is stored in the pallet information on each pallet 21 when ante-machining products (blank materials X or semimanufactured products Y) are moved from each basket 420 to each such pallet 21. The correlation information includes information for correlating workpieces W with the blank materials X and information for correlating the workpieces W with the semimanufactured products Y.

Further, as shown in FIG. 20, the transfer reservation information includes reservation order (reservation numbers), the kind of the workpieces W temporarily placed on the temporary support table 10, 11, the basket number for the workpieces W concerned, the machining progress status of the workpieces W concerned and the number of the workpieces W concerned. Here, the basket number for the workpieces W can be obtained based on the information included in the pallet information.

The "transfer between machine tool and pallet rack" processing in the fourth embodiment is the same as the processing in the third embodiment shown in FIG. 14, and therefore, the description of the processing is omitted.

("Attaching Workpieces to Pallet" Processing)

Figure 21:
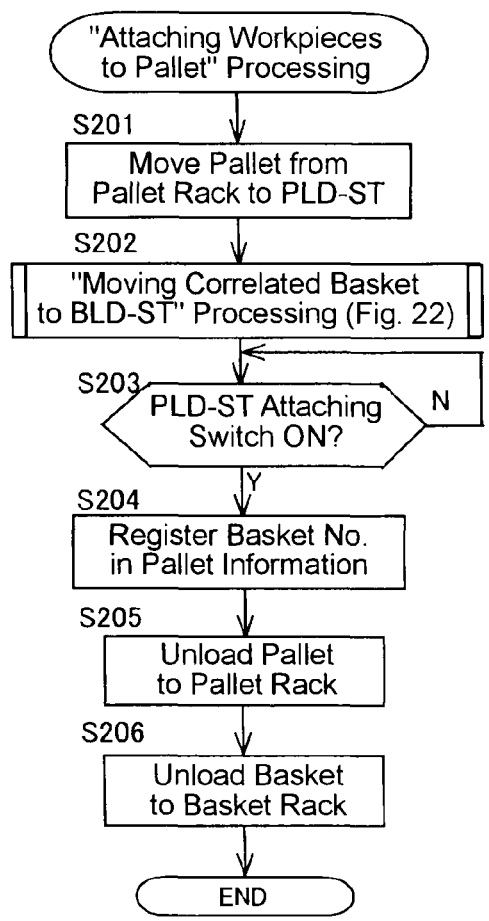
FIG. 21 is a flow chart showing a processing for attaching workpieces to a pallet in the fourth embodiment.
Figure 22:
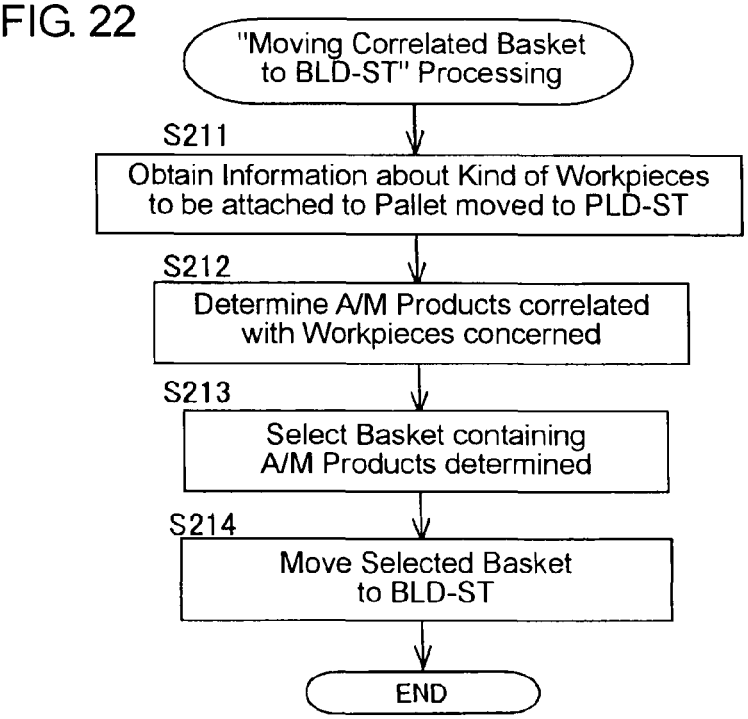
FIG. 22 is a flow chart showing a processing for moving a correlated basket to the basket loading station in the fourth embodiment.

An "attaching workpieces to pallet" processing in the fourth embodiment will be described with reference to FIGS. 21 and 22. As shown in FIG. 21, first of all, a pallet 21 to which ante-machining products (blank materials X or semimanufactured products Y) are to be attached is moved from the pallet rack 5 to the pallet loading station (PLD-ST) 8, 9 (S201). Although it is often the case that post-machining products (finished products Z or semimanufactured products Y) have already been attached to the pallet 21, it may be the case that no workpiece W has been attached thereto. If it is the case that post-machining products (finished products Z or semimanufactured products Y) have already been attached to the pallet 21, the worker detaches the post-machining products (finished products Z or semimanufactured products Y) from the pallet 21 at the PLD-ST 8, 9 and places the detached products on the temporary support table 10, 11. Further, the worker enters transfer reservation information including the kind, basket number, machining progress status and the number of the detached post-machining products (finished products Z or semimanufactured products Y).

Then, a "moving correlated basket to BLD-ST" processing is executed (S202). This processing is a processing for determining ante-machining products (blank materials X or semimanufactured products Y) correlated with the workpieces W to be attached to the pallet 21 which has been just moved to the PLD-ST 8, 9 and for moving a blank material basket 22 or a semimanufactured product basket (not shown) containing the determined ante-machining products (blank materials X or semimanufactured products Y) to the basket loading station (BLD-ST) 6, 7. This processing corresponds to means or step of transferring "ante-machining product basket" in the claimed invention. The details of this processing will be described later with reference to FIG. 22.

Then, a judgment is made of whether or not the worker is turning the PLD-ST attaching switch into ON (S203). The worker turns the PLD-ST attaching switch into ON when completing attaching the ante-machining products (blank materials X or semimanufactured products Y) to the pallet 21. This information is inputted into the control apparatus 400 and is stored in the memory section 404. Then, if the worker turns the PLD-ST attaching switch into ON (Yes at S203), the basket number is stored in the pallet information on the pallet 21 (S204). This basket number is the basket number included in the basket information on the basket 420 which contained the blank materials X or the semimanufactured products Y having been now attached to the pallet 21.

Then, the pallet 21 at the PLD-ST 8, 9 is unloaded to the pallet rack 5 (S205), the basket 420 at the BLD-ST 6, 7 is unloaded to the basket rack 4 (S206), and the processing is terminated. Further, unless the worker turns the PLD-ST attaching switch into ON (No at S203), the processing is repeated until the PLD-ST attaching switch is turned into ON.

Next, the "moving correlated basket to BLD-ST" processing at step S202 in FIG. 21 will be described with reference to FIG. 22. First of all, there is obtained information about the kind of the workpieces W which is to be attached to the pallet 21 moved to the PLD-ST 8, 9 (S211). Then, the ante-machining products (blank materials X or semimanufactured products Y) correlated with the workpiece W are determined based on the correlation information stored in the memory section 404 (S212).

Then, selection is made for a basket 420 which contains the determined ante-machining products (blank materials X or semimanufactured products Y) (S213). Subsequently, the selected basket 420 is moved to the BLD-ST 6, 7, and the processing is terminated.

("Transfer from Temporary Support Table to Basket Rack" Processing)

Next, a "transfer from temporary support table to basket rack" processing in the fourth embodiment will be described with reference to FIG. 23. This processing corresponds to means or step of transferring "post-machining product basket" in the claimed invention. First of all, the transfer reservation information stored in the memory section 404 of the control apparatus 400 is obtained (S221). Then, a basket 420 which is to receive the post-machining products (finished products Z or semimanufactured products Y) is selected based on the transfer reservation information (S222). Concretely, selected is the basket 420 which should receive the post-machining products (finished products Z or semimanufactured products Y) having the same workpiece kind and basket number as those included in the transfer reservation information. Then, the selected basket 420 is moved to the BLD-ST 6, 7, and the processing is terminated.

(Effects of Fourth Embodiment)

In the fourth embodiment, whenever a basket 420 which is to receive post-machining products Y, Z is to be transferred to the BLD-ST 6, 7, such transfer is carried out based on the basket number for the ante-machining products X, Y and the basket number for the workpiece W. As a result, it becomes possible for the worker to put into the basket 420 the post-machining products Y, Z all of which are same as to the basket number.

In particular, after taken out from a basket 420, ante-machining products X, Y are machined to turn to post-machining products Y, Z, which are then put into the original basket 420. That is, each basket 420 becomes to receive the post-machining products Y, Z identical to the ante-machining products X, Y which it contained. Thus, it becomes possible to control the ante and post-machining products on the basket basis. As a result, by receiving a plurality of ante-machining products X, Y in the same basket 420 as a lot to be controlled, it becomes possible for example to carry out a lot basis control in the event that defectives are produced, for example.

Further, in this case, each ante-machining product basket serves as post-machining product basket, so that baskets required for the system can be decreased in number.

Various features and many of the attendant advantages in the foregoing embodiments will be summarized as follows:

In the foregoing first embodiment typically shown in FIGS. 1-3, 6 and 7, because the control apparatus 100 stores the correlation information therein, it becomes possible to grasp the correspondence between the workpieces W to be attached to a pallet 21 and the ante-machining products X, Y. Concretely, the correlation therebetween can be established by the part number of the workpieces W and the product number of the ante-machining products X, Y. Then, when a pallet 21 is transferred to the pallet loading station (PLD-ST) 8, 9, the control apparatus 100, by utilizing the correlation information, controls the transfer device 12 to transfer an ante-machining product basket containing blank materials X or semimanufactured products Y which are the ante-machining workpieces W to be attached to the pallet 21, to the basket loading station (BLD-ST) 6, 7 in connection with the transferring of the pallet 21 to the PLD-ST 8, 9. Thus, the worker is not required to search for the ante-machining product basket. Accordingly, it becomes possible to reduce the time taken for the worker to search for the ante-machining product basket.

Further, the ante-machining product basket is transferred to the BLD-ST 6, 7 in connection with transferring the pallet 21 to the PLD-ST 8, 9. This can be realized by storing the correlation information in the control apparatus 100 in advance. By the synchronized or connected operations, it becomes possible to further shorten the time period during which the pallet 21 is caused to wait at the PLD-ST 8, 9. Thanks to these advantages, it becomes possible to enhance the operational efficiency of the flexible manufacturing system.

Also in the foregoing first embodiment typically shown in FIGS. 1-4 and 6-8, of the transfer operations for an ante-machining product basket and a post-machining product basket, the transfer operation for the ante-machining product basket is carried out in preference to that for the post-machining product basket (FIG. 4, S8 and S10). By the way, in the prior art system, it has been a practice that when a pallet with post-machining products attached thereto is transferred to a pallet loading station, the worker first makes a post-machining product basket transferred to a basket loading station for receiving the post-machining products and then, moves the post-machining products from the pallet to the post-machining product basket. Thereafter, the worker makes an ante-machining product basket containing ante-machining products therein transferred to a basket loading station and then, moves the ante-machining products from the ante-machining product basket to the pallet. Thus, in the prior art system, a long time is unavoidable to be taken from the time when the pallet is transferred to the pallet loading station, to the time when ante-machining products are attached to the pallet. That is, much time has to be taken until the pallet with the ante-machining products thereto is stored in a pallet rack.

On the contrary, in the present embodiment, when a pallet 21 with post-machining products Y, Z attached thereto is transferred to the PLD-ST 8, 9, attaching ante-machining products X, Y to the pallet 21 is carried out on a priority basis before moving the post-machining products Y, Z to the post-machining product basket (FIG. 4, S8 and S10). Accordingly, it can be done to store the pallet 21 with the ante-machining products X, Y attached thereto at an early stage. Thus, it becomes possible to execute the schedule control of the machine tool 1, 2 more reliably.

Also in the foregoing first embodiment typically shown in FIGS. 1-3 and 7, where there exist a plurality of ante-machining product baskets each storing ante-machining products X, Y of the same kind and where a plurality of workpieces W are to be attached to a pallet 21, an ante-machining product basket to be transferred to the BLD-ST 6, 7 is determined based on the number of workpieces W to be attached and the respective numbers of the ante-machining products contained in the respective ante-machining product baskets. Therefore, it becomes possible to lessen the number of transfer operations for ante-machining product baskets. For example, let it be assumed that two workpieces are to be attached to one pallet and there exist an ante-machining product basket containing one ante-machining product and another ante-machining product basket containing two ante-machining products. In this instance, if the ante-machining product basket containing one ante-machining product is transferred earlier, it would result that the transfer operation for ante-machining product basket has to be performed twice. On the other hand, if the ante-machining product basket containing two ante-machining products is transferred earlier, this transfer operation alone makes it possible for the worker to attach two workpieces to the pallet. In this way, the number of the transfer operations for ante-machining product basket can be decreased by determining an ante-machining product basket to be transferred, based on the number of required workpieces and the respective numbers of ante-machining products contained in the respective ante-machining product baskets.

Also in the foregoing first embodiment typically shown in FIGS. 1-3 and 7, since when a plurality of workpieces W are to be attached to a pallet 21 at the PLD-ST 8, 9, the control apparatus 100 selects one of the ante-machining product baskets which contains the ante-machining products of the number equal to or greater than the workpieces W to be attached (FIG. 7, S45), it becomes possible to reliably lessen the number of the transfer operations for ante-machining product basket.

Also in the foregoing first embodiment typically shown in FIGS. 1-3 and 7, the control apparatus 100 controls the transfer device 12 to transfer to the BLD-ST 6, 7 one of the ante-machining product baskets which contains a largest number of the ante-machining products X, Y (FIG. 7, S51 and S50). Thus, if it is the case that there exists no ante-machining product basket which contains ante-machining products of the number equal to or greater than the workpieces to be attached to the pallet 21 (FIG. 7, No at S46), it becomes possible to decrease the number of transfer operations for ante-machining product basket as small as possible.

Also in the foregoing first embodiment typically shown in FIGS. 1-3 and 7, an ante-machining product basket which can make the transfer distance of the transfer device 12 shorter is transferred where a plurality of ante-machining product baskets are selectable (FIG. 7, S52 and S50). Accordingly, it becomes possible to shorten the time period in movement of the transfer device 12.

Also in the foregoing first embodiment typically shown in FIGS. 1-3 and 7, where a plurality of ante-machining product baskets are selectable, the machining order for ante-machining products contained in the ante-machining product baskets are determined to give the priority to those in the ante-machining product basket which is older or earlier in the time of receiving the ante-machining products than other ante-machining product baskets (FIG. 7, S49). Therefore, it can be done reliably to replace blank materials.

Additionally, where a plurality of ante-machining product baskets are selectable, the priority may be given to realizing the reduction of the time period in movement of the transfer device 12 or machining the ante-machining products which were put into an ante-machining product basket earlier than those which were put later into another ante-machining product basket. The selection of the ante-machining product baskets can be made in dependence on which of these alternatives should be given the priority.

As mentioned earlier, in connection with the transfer of a pallet 21 to the PLD-ST 8, 9, the control apparatus 100 executes the transfer operation of an ante-machining product basket in preference to the transfer operation of a post-machining product basket. Thus, there may arise a problem that post-machining products are left to remain at the PLD-ST 8, 9 for a considerable period of time. However, in the foregoing first embodiment typically shown in Figures in FIGS. 1-3 and 8, the problem can be solved by transferring the post-machining product basket to the BLD-ST 6, 7 based on transfer reservation information, whereby it becomes possible for the worker to move the remaining post-machining products properly to the post-machining product basket. Since the transfer of the post-machining product basket to the BLD-ST 6, 7 can be done by utilizing the unscheduled time of the transfer device 12, the efficiency of the system operation can be prevented from being lowered.

Also in the foregoing first embodiment typically shown in FIGS. 1-3 and 8, where there exist a plurality of post-machining product baskets each containing post-machining products of the same kind and when a plurality of post-machining products are to be detached from a pallet 21, a post-machining product basket to be transferred to the BLD-ST 6, 7 is determined based on the number of the post-machining products to be detached from the pallet 21 and the respective numbers of post-machining products which the post-machining product baskets concerned are able to further receive therein (FIG. 8, S64). Thus, it becomes possible to decrease the number of transfer operations of the post-machining product baskets. For example, let it be assumed that two post-machining products have been attached to one pallet and that there exist a post-machining product basket which is able to further receive one post-machining product only and another post-machining product basket which is able to further receive two or more post-machining products. In this instance, if the post-machining product basket which is able to further receive one post-machining product only is transferred earlier to the BLD-ST 6, 7, it would result that the transfer operations of the post-machining product basket has to be carried out twice. On the contrary, if the post-machining product basket which is able to further receive two or more post-machining products is transferred earlier, the worker is able to move the post-machining products to the post-machining product basket through only one transfer operation of the same. In this way, the transfer operation of the post-machining product basket can be decreased by determining a post-machining product basket to be transferred to the BLD-ST 6, 7 based on the on the number of the post-machining products to be detached from the pallet 21 and the respective numbers of post-machining products which the post-machining product baskets concerned are able to further receive therein.

Also in the foregoing first embodiment typically shown in FIGS. 1-3 and 8, since like the instance described in the preceding paragraph, there is selected one post-machining product basket which is able to further receive post-machining products of the number equal to or greater than those detached from the pallet 21 (FIG. 8, S64), the transfer operations of the post-machining product baskets can be decreased reliably.

Also in the foregoing first embodiment typically shown in FIGS. 1-3 and 8, since if there is selected no post-machining product basket which is able to further receive the post-machining products of the number equal to or greater than those detached from the pallet 21 (FIG. 8, No at S65), one post-machining product basket which is largest in the number of post-machining products to further receive therein is transferred to the BLD-ST 6, 7 (FIG. 8, S70 and S69). Therefore, the number of the transfer operations of the post-machining product baskets can be decreased as small as possible.

Also in the foregoing first embodiment typically shown in FIGS. 1-3 and 8, where a plurality of post-machining product baskets are selectable, it is done to transfer to the BLD-ST 6, 7 one post-machining product basket which can make the transfer distance from the basket rack 4 to the BLD-ST 6, 7 shorter (FIG. 8, S71 and S69). Thus, the time period in movement of the transfer device 12 can be shortened.

Also in the foregoing first embodiment typically shown in FIGS. 1-3 and 8, where a plurality of post-machining product baskets are selectable, it is done to select and transfer to the BLD-ST 6, 7 one post-machining product basket which is oldest or earliest in the time at which each of the post-machining product baskets concerned first received the post-machining products therein, whereby an older post-machining product basket becomes full earlier. Therefore, it becomes possible to replace the post-machining product baskets reliably.

Additionally, where a plurality of post-machining product baskets are selectable, the priority may be given to realizing the reduction of the time period in movement of the transfer device 12 or transferring the post-machining product baskets in the order that the post-machining product baskets respectively received the post-machining products. The selection of the post-machining product baskets concerned can be made in dependence on which of these alternatives should be given the priority.

In the foregoing third embodiment typically shown in FIGS. 1, 11, 13 and 17, in the transfer operation for post-machining product baskets, a post-machining product basket is selected based on the workpiece lot information, the ante-machining product lot information and the post-machining product lot information (FIG. 17, S142) and is transferred to the BLD-ST 6, 7 (FIG. 7, S149). Thus, the worker can put the post-machining products all of which coincide in the lot information, into the transferred post-machining product basket. Therefore, the worker (user) can control the post-machining products in the basket as one group. As a result, it becomes possible to make a lot-basis control in the event that defectives are produced, for example.

Also in the foregoing third embodiment typically shown in FIGS. 1, 11, 13, 16 and 17, since the lot information is included as information relating to the respective baskets and pallets, the lot-basis control can be made easily and reliably.

Figure 18:
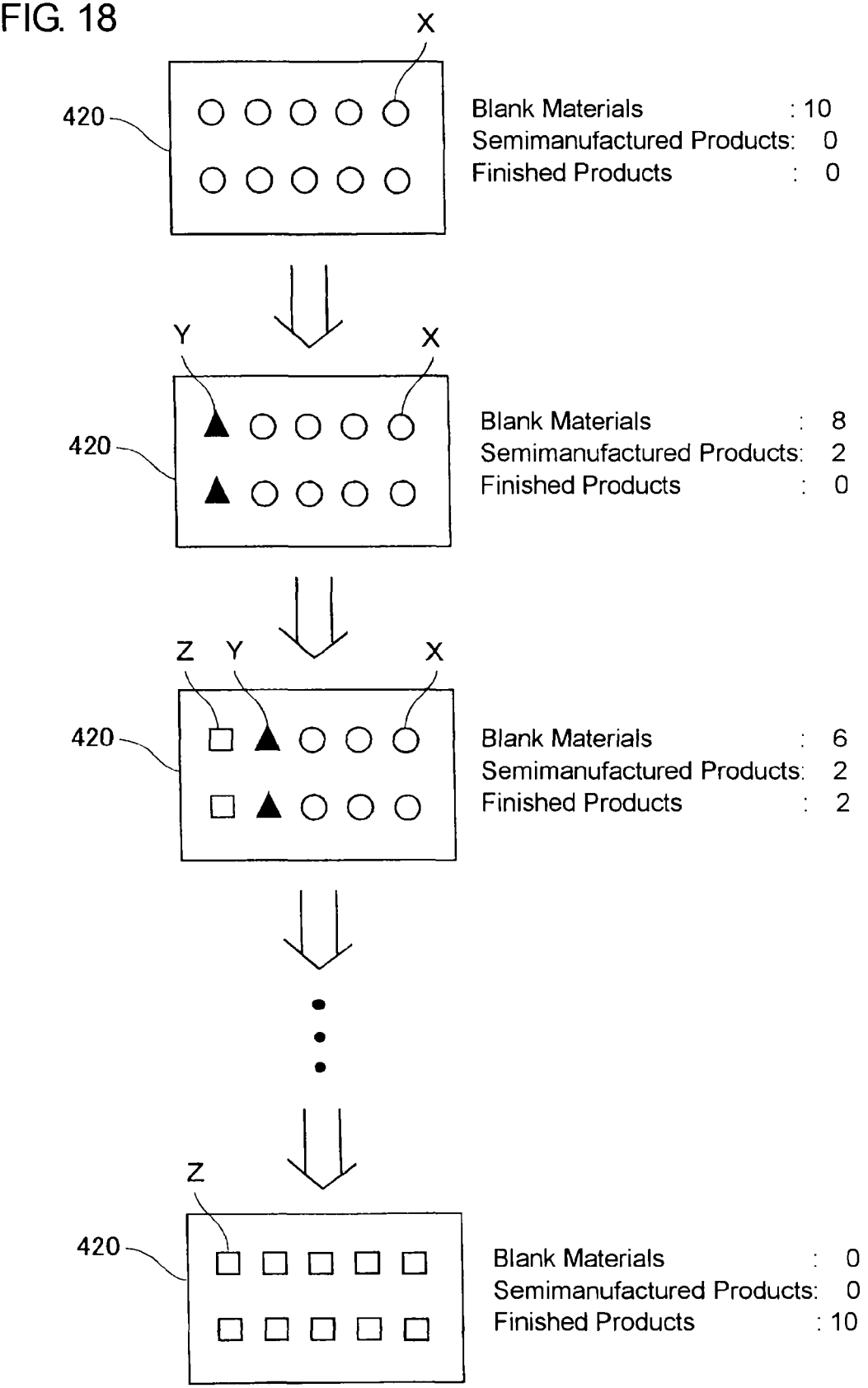
FIG. 18 is an explanatory view for explaining the progress that blank materials X in a basket 420 change, as time goes, to semi-manufactured products Y and finished products Z in a flexible manufacturing system in the fourth embodiment according to the present invention.
Figure 23:
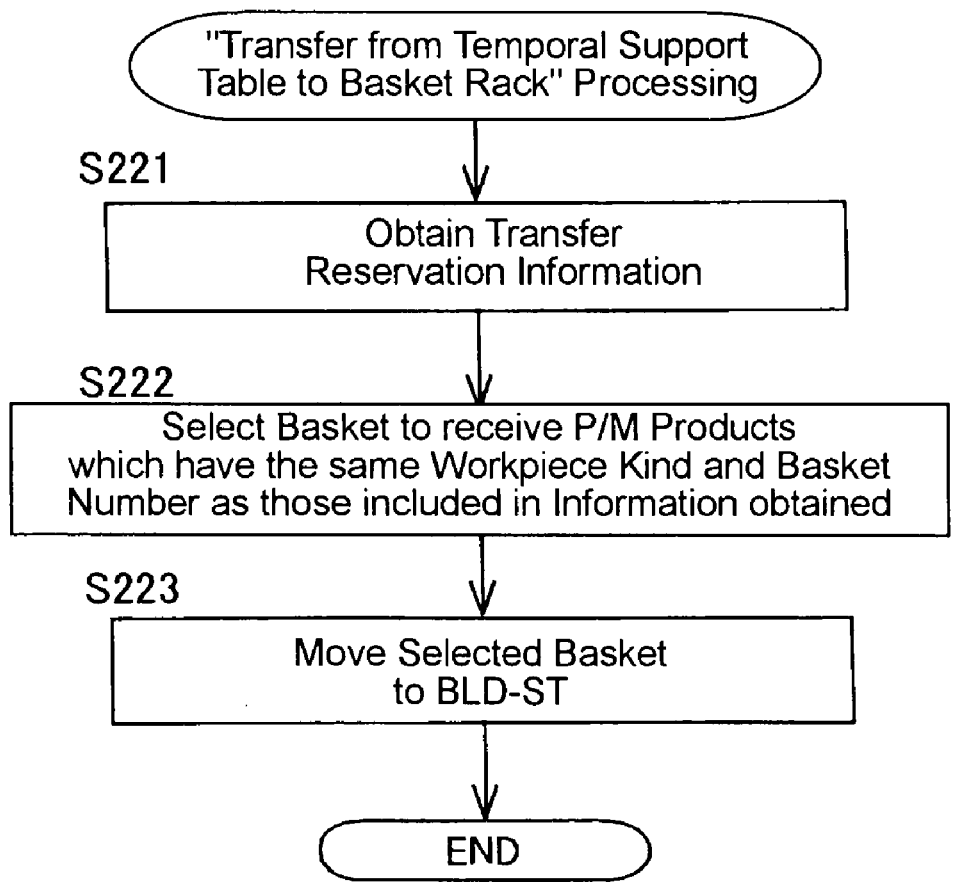
FIG. 23 is a flow chart showing a processing for transfer from the temporary support tables to the basket rack in the fourth embodiment.

In the foregoing fourth embodiment typically shown in FIGS. 1, 18-20 and 23, when ante-machining products are taken out of a basket and are machined to become post-machining products, the same are put into the same or original basket (FIG. 23, S222 and S223). That is, placing a focus on a particular basket 420, the post-machining products are put into the same basket 420 in which the ante-machining products before machining were contained, as depicted in FIG. 18. Therefore, in the present embodiment, the control on a basket-by-basket basis can be realized. In this case, each ante-machining product basket 420 also serves as post-machining product basket.

Also in the foregoing fourth embodiment typically shown in FIGS. 1, 18-20 and 23, since the lot information is information which defines as one group one lot being a manufacturing unit of products, it is possible to control each lot as one group. That is, it is possible to grasp which lot each post-machining product belongs to.

Also in the foregoing fourth embodiment typically shown in FIGS. 1, 18-20 and 23, since the lot information is information which defines as one group a plurality of ante-machining products contained in each of the ante-machining product baskets 420, the control on the basis of each ante-machining product basket can be realized (e.g., FIG. 18). Thus, the control on a lot-basis can be realized by containing a plurality of ante-machining products to be controlled as one group in the same basket 420.

Also in the foregoing fourth embodiment typically shown in FIGS. 1, 18-20 and 23, since each of the ante-machining product baskets is the same as each of the post-machining product baskets which is common thereto in terms of the kind of workpieces W, it becomes possible to decrease the number of baskets required.

Also in the foregoing third embodiment typically shown in FIGS. 1, 11, 13 and 17, since each ante-machining product basket is the same as a corresponding post-machining product basket, but is distinguished therefrom by the difference in the status of machining progress. For example, for each kind of workpieces W, each basket therefor is handled or treated as if it were divided into respective baskets such as one for blank materials, one for finished products and one for semimanufactured products. Thus, those different in the status of machining progress can be avoided to exist mixed, and hence, the blank materials, semimanufactured products and finished products can be controlled and grasped easily.

Figure 17:
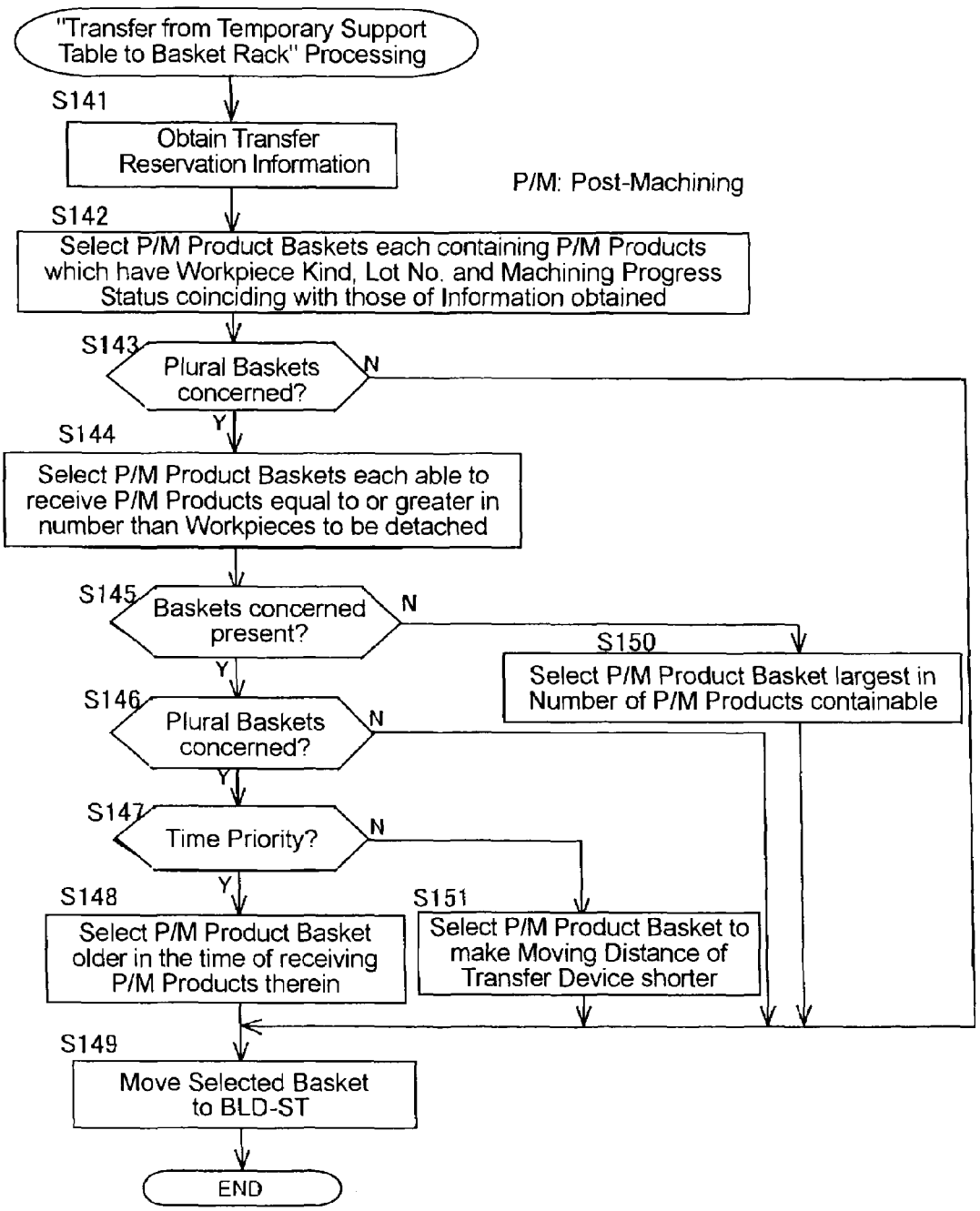
FIG. 17 is a flow chart showing a processing for transfer from the temporary support tables to the basket rack in the third embodiment.

Also in the foregoing third embodiment typically shown in FIGS. 1, 11, 13 and 17, since each post-machining product basket is selected based on the workpiece lot information, ante-machining product lot information, and post-machining product lot information (FIG. 17, S142) and is transferred to the BLD-ST 6, 7 (FIG. 17, S149). Thus, it becomes possible for the worker to put the post-machining products Y, Z all of which coincide in lot information, into the selected post-machining product basket. Therefore, the worker (user) can control as one group the plurality of post-machining products Y, Z contained in each post-machining product basket, and hence, the control on a lot-by-lot basis can be realized in the event that defectives are produced, for example.

Obviously, further numerous modifications and variations of the present invention are possible in light of the above teachings. It is therefore to be understood that within the scope of the appended claims, the present invention may be practiced otherwise than as specifically described herein.

What is claimed is:

1. A flexible manufacturing system comprising:
  a plurality of pallets each for attaching an ante-machining workpiece thereto;
  a machine tool for machining an ante-machining workpiece attached to a selected one of the pallets to form a post-machining product being a finished product or a semimanufactured product;
  a plurality of ante-machining product baskets each for containing ante-machining products being blank materials or semimanufactured products which are ante-machining workpieces to be attached to the pallets;
  a pallet rack capable of storing the plurality of pallets therein;
  a basket rack capable of storing the plurality of ante-machining product baskets therein;
  a basket loading station for temporarily placing a selected one of the ante-machining product baskets thereon in moving an ante-machining product contained in the selected one of the ante-machining product baskets to a selected one of the pallets;
  a pallet loading station provided to be adjacent to the basket loading station for temporarily placing the selected one of the pallets thereon in moving the ante-machining product to the selected one of the pallets;
  a transfer device for transferring the selected one of the pallets between the pallet rack and the pallet loading station and for transferring the selected one of the ante-machining product baskets between the basket rack and the basket loading station; and
  a control apparatus for performing the transfer control of the transfer device;
  wherein the control apparatus includes:
  storage means for storing correlation information which correlates the ante-machining workpieces to be attached to the pallets with the ante-machining products contained in the ante-machining product baskets;
  determination means for determining an ante-machining product corresponding to the ante-machining workpiece to be attached to the selected one of the pallets in connection with transferring the selected one of the pallets to the pallet loading station; and
  transfer control means for controlling the transfer device to transfer one of the ante-machining product baskets containing the determined ante-machining products, from the basket rack to the basket loading station in connection with transferring the selected one of the pallets to the pallet loading station.

2. The flexible manufacturing system as set forth in claim 1, further comprising:
  a plurality of post-machining product baskets each for containing post-machining products therein; wherein:
  the basket rack is capable of storing the plurality of post-machining product baskets;
  the basket loading station is able to temporarily place a selected one of the post-machining product baskets prior to moving the post-machining product attached to the selected one of the pallets to the selected one of the post-machining product baskets; and the control apparatus includes:
  ante-machining product basket transfer control means for controlling the transfer device to transfer a selected one of the ante-machining product baskets to the basket loading station prior to attaching an ante-machining product being an ante-machining workpiece, to a selected one of the pallets transferred to the pallet loading station; and
  post-machining product basket transfer control means for controlling the transfer device to transfer a selected one of the post-machining product baskets to the basket loading station prior to putting the post-machining product detached from the pallet transferred to the pallet loading station, into the selected one of the post-machining product baskets;
  wherein, when the ante-machining product basket transfer is in conflict with the post-machining product basket transfer, the control apparatus is configured to operate the ante-machining product basket transfer control means in preference to the post-machining product basket transfer control means in connection with transferring the selected one of the pallets to the pallet loading station.

3. The flexible manufacturing system as set forth in claim 1, wherein when a plurality of ante-machining workpieces are to be attached to the pallet at the pallet loading station, the control apparatus is configured to transfer to the basket loading station one of the ante-machining product baskets which is determined based on the number of the ante-machining workpieces to be attached and the number of the ante-machining products correlated with the ante-machining workpieces to be attached and contained in each of the ante-machining product baskets.

4. The flexible manufacturing system as set forth in claim 3, wherein when a plurality of ante-machining workpieces are to be attached to a pallet at the pallet loading station, the control apparatus is configured to select one of the ante-machining product baskets which contains the ante-machining products of the number equal to or greater than the number of the ante-machining workpieces to be attached and then to control the pallet transfer device to transfer the selected ante-machining product basket to the basket loading station.

5. The flexible manufacturing system as set forth in claim 3, wherein when a plurality of ante-machining workpieces are to be attached to a pallet at the pallet loading station and if each of the ante-machining product baskets contains a smaller number of ante-machining products than the ante-machining workpieces to be attached, the control apparatus is configured to control the transfer device to transfer to the basket loading station one of the ante-machining product baskets which contains a largest number of the ante-machining products.

6. The flexible manufacturing system as set forth in claim 3, wherein when a plurality of ante-machining workpieces are to be attached to a pallet at the pallet loading station and if a plurality of ante-machining product baskets each containing the ante-machining products of the number equal to or greater than the number of the ante-machining workpieces to be attached are present, the control apparatus is configured to select an ante-machining product baskets which can make the transfer distance from the basket rack to the basket loading station shorter, and then, to control the transfer device to transfer the selected ante-machining product basket to the basket loading station.

7. The flexible manufacturing system as set forth in claim 3, wherein the control apparatus includes time storage means for storing respective times at which the ante-machining product baskets are first stored in the basket rack and wherein when a plurality of ante-machining workpieces are to be attached to a pallet at the pallet loading station and if a plurality of ante-machining product baskets each containing the ante-machining products of the number equal to or greater than the number of the ante-machining workpieces to be attached are present, the control apparatus is configured to select from the ante-machining product baskets one ante-machining product basket which is oldest in the time of storage in the basket rack, and then, to control the transfer device to transfer the selected one ante-machining product basket to the basket loading station.

8. The flexible manufacturing system as set forth in claim 2, wherein:
  the control apparatus includes lot information storage means for storing lot information which defines a plurality of post-machining products as one lot, the lot information including workpiece lot information relating to the ante-machining workpieces grasped on the basis of each kind of the ante-machining workpieces and product lot information relating to the post-machining products grasped on the basis of each kind of the post-machining products; and
  when one of the post-machining product baskets is to be transferred to the basket loading station, the control apparatus is configured to control the transfer device to transfer the selected one of the post-machining product baskets to the basket loading station based on the workpiece lot information and the product lot information so that each post-machining product basket comes to contain therein the post-machining products all of which coincide in the lot information.

9. The flexible manufacturing system as set forth in claim 8, wherein when one post-machining product basket is to be transferred to the basket loading station, the control apparatus is configured to control the transfer device to transfer said one post-machining product basket to the basket loading station so that the post-machining products are stored in said one post-machining product basket in which the post-machining products were contained as the ante-machining products.

10. The flexible manufacturing system as set forth in claim 8, wherein the lot information is information which grasps as one group one lot being a manufacturing unit of products.

11. The flexible manufacturing system as set forth in claim 8, wherein the lot information is information which grasps as one group a plurality of ante-machining products contained in each of the ante-machining product baskets.

12. The flexible manufacturing system as set forth in claim 2, wherein each ante-machining product basket and each corresponding post-machining product basket are constituted by the same basket.

13. The flexible manufacturing system as set forth in claim 2, wherein each ante-machining product basket and each corresponding post-machining product basket are constituted by the same basket, but are distinguished from each other by the difference in the status of machining progress.

14. The flexible manufacturing system as set forth in claim 2, further comprising:
  a temporary support table provided to be adjacent to the pallet loading station and used for temporarily placing thereon the post-machining product detached from the pallet at the pallet loading station before being put into one of the post-machining product baskets; and wherein:
  the control apparatus further includes transfer reservation information storage means for storing transfer reservation information about the post-machining product temporarily placed on the temporary support table; and the control apparatus is configured to control the transfer device based on the transfer reservation information to transfer to the basket loading station one of the post-machining product baskets which is able to receive the post-machining product temporarily placed on the temporary support table.

15. The flexible manufacturing system as set forth in claim 14, wherein where after machining in the machine tool, a plurality of post-machining products attached to a selected one of the pallets are detached from the selected one of the pallets to be put into one of the post-machining product baskets, the control apparatus is configured to determine one of the post-machining product baskets based on the number of the detached post-machining products and the respective numbers of the detached post-machining products which are containable in the respective post-machining product baskets, and then, to control the transfer device to transfer the determined one post-machining product basket to the basket loading station.

16. The flexible manufacturing system as set forth in claim 15, wherein where the plurality of post-machining products detached from the selected one of the pallets are to be put into one of the post-machining product baskets, the control apparatus is configured to select one post-machining product basket which is able to receive post-machining products of the number equal to or greater than the plurality of post-machining products detached from the selected one of the pallets, and then, to control the transfer device to transfer the selected one post-machining product basket to the basket loading station.

17. The flexible manufacturing system as set forth in claim 15, wherein where the plurality of post-machining products detached from the selected one of the pallets are to be put into one of the post-machining product baskets and if none of the post-machining product baskets is able to receive post-machining products of the number equal to or greater than the plurality of post-machining products detached from the selected one of the pallets, the control apparatus is configured to control the transfer device to transfer one post-machining product basket which is largest in the number to receive therein, to the basket loading station.

18. The flexible manufacturing system as set forth in claim 15, wherein where the plurality of post-machining products detached from the selected one of the pallets are to be put into one of the post-machining product baskets and if there exist a plurality of post-machining product baskets each of which is able to receive post-machining products of the number equal to or greater than the plurality of post-machining products detached from the selected one of the pallets, the control apparatus is configured to select one post-machining product basket which can make the transfer distance of the transfer device shorter, and then, to control the transfer device to transfer the selected one post-machining product basket to the basket loading station.

19. The flexible manufacturing system as set forth in claim 15, wherein the control apparatus includes another time storage means for storing respective times at which the post-machining product baskets first received the post-machining products therein and wherein where the plurality of post-machining products detached from the selected one of the pallets are to be put into one of the post-machining product baskets and if there exist a plurality of post-machining product baskets each of which is able to receive post-machining products of the number equal to or greater than the plurality of post-machining products detached from the selected one of the pallets, the control apparatus is configured to select from the plurality of post-machining product baskets one post-machining product basket which is oldest in the time at which each of the post-machining product baskets first received the post-machining products therein, and then, to control the transfer device to transfer the selected one post-machining product basket to the basket loading station.

20. The flexible manufacturing system as set forth in claim 8, wherein:
the lot information storage means stores the kind and lot information of the ante-machining products as information relating to the ante-machining product baskets, stores the kind and lot information of the post-machining products as information relating to the post-machining product baskets, and stores the kind and lot information of the ante-machining workpieces as information relating to the pallets; and
when one post-machining product basket is to be transferred to the basket loading station, the control apparatus is configured to control the transfer device to transfer to the basket loading station one post-machining product basket having the lot information which coincides with the lot information of the ante-machining workpieces.

21. A flexible manufacturing system comprising:
a plurality of pallets each for attaching an ante-machining workpiece thereto;
a machine tool for machining an ante-machining workpiece attached to a selected one of the pallets to form a post-machining product being a finished product or a semimanufactured product;
a plurality of ante-machining product baskets each for containing ante-machining products being blank materials or semimanufactured products which are the ante-machining workpieces to be attached to the pallets;
a plurality of post-machining product baskets each for containing the post-machining products thereon;
a pallet rack capable of storing the plurality of pallets therein;
a basket rack capable of storing the plurality of ante-machining product baskets and the plurality of post-machining product baskets therein;
a basket loading station for temporarily placing a selected one of the ante-machining product baskets thereon in moving an ante-machining product contained in the selected one of the ante-machining product baskets to a selected one of the pallets and for temporarily placing a selected one of the post-machining product baskets thereon in moving the post-machining product attached to the selected one of the pallets to the selected one of the post-machining product baskets;
a pallet loading station provided to be adjacent to the basket loading station for temporarily placing the selected one of the pallets thereon in moving the ante-machining product to the selected one of the pallets;
a transfer device for transferring the selected one of the pallets between the pallet rack and the pallet loading station and for transferring the selected one of the ante-machining product baskets and the selected one of the post-machining product baskets between the basket rack and the basket loading station; and
a control apparatus for performing the transfer control of the transfer device;
wherein the control apparatus includes lot information storage means for storing lot information defining a plurality of ante-machining products as one lot, the lot information including workpiece lot information relating to the ante-machining workpieces grasped on the basis of each kind of the ante-machining workpieces and product lot information relating to the post-machining products grasped on the basis of each kind of the post-machining products; and wherein the control apparatus is configured to control the transfer device to selectively transfer the post-machining product baskets to the basket loading station based on the workpiece lot information and the product lot information so that each of the post-machining product baskets comes to contain therein the post-machining products all of which coincide in the lot information.

22. A control method for a flexible manufacturing system comprising:
   a plurality of pallets each for attaching an ante-machining workpiece thereto;
   a machine tool for machining an ante-machining workpiece attached to a selected one of the pallets to form a post-machining product being a finished product or a semimanufactured product;
   a plurality of ante-machining product baskets each for containing ante-machining products being blank materials or semimanufactured products which are ante-machining workpieces to be attached to the pallets;
   a pallet rack capable of storing the plurality of pallets therein;
   a basket rack capable of storing the plurality of ante-machining product baskets therein;
   a basket loading station for temporarily placing a selected one of the ante-machining product baskets in moving an ante-machining product contained in the selected one of the ante-machining product baskets to a selected one of the pallets;
   a pallet loading station provided to be adjacent to the basket loading station for temporarily placing a selected one of the pallets thereon in moving the ante-machining product to the selected one of the pallets;
   a transfer device for transferring the selected one of the pallets between the pallet rack and the pallet loading station and for transferring the selected one of the ante-machining product baskets between the basket rack and the basket loading station; and
   a control apparatus for performing the transfer control of the transfer device;
   wherein the control apparatus executes the step of:
   storing correlation information for correlating the ante-machining workpieces to be attached to the pallets with the ante-machining products contained in the ante-machining product baskets; and
   wherein in connection with transferring a selected one of the pallets to the pallet loading station, the control apparatus further executes the steps of:
   determining an ante-machining product corresponding to an ante-machining workpiece which is to be attached to the selected one of the pallets transferred to the pallet loading station, based on the correlation information; and
   controlling the transfer device to transfer an ante-machining product basket containing the determined ante-machining product therein from the basket rack to the basket loading station in connection with transferring the selected one of the pallets to the pallet loading station.

23. A control method for a flexible manufacturing system comprising:
   a plurality of pallets each for attaching an ante-machining workpiece thereto;
   a machine tool for machining an ante-machining workpiece attached to the selected one of the pallets to form a post-machining product being a finished product or a semi-manufactured product;
   a plurality of ante-machining product baskets each for containing ante-machining products being blank materials or semimanufactured products which are ante-machining workpieces to be attached to the pallets;
   a plurality of post-machining product baskets each for containing post-machining products therein;
   a pallet rack capable of storing the plurality of pallets therein;
   a basket rack capable of storing the plurality of ante-machining product baskets and the plurality of post-machining product baskets therein;
   a basket loading station for temporarily placing a selected one of the ante-machining product baskets thereon in moving an ante-machining product contained in the selected one of the ante-machining product baskets to the selected one of the pallets and for temporarily placing a selected one of the post-machining product baskets thereon in moving the post-machining product attached to the selected one of the pallets to the selected one of the post-machining product baskets;
   a pallet loading station provided to be adjacent to the basket loading station for temporarily placing the selected one of the pallets thereon in moving the ante-machining product contained in the selected one of the ante-machining product baskets to the selected one of the pallets;
   a transfer device for transferring the selected one of the pallets between the machine tool, the pallet rack and the pallet loading station and for transferring the selected one of the ante-machining product baskets and the selected one of the post-machining product baskets between the basket rack and the basket loading station; and
   a control apparatus for performing the transfer control of the transfer device;
   wherein the control apparatus executes the steps of:
   storing lot information for defining as one group the plurality of ante-machining products contained in each of the ante-machining product baskets, the lot information including workpiece lot information relating to the ante-machining workpieces grasped on the basis of each kind of the ante-machining workpieces and product lot information relating to the post-machining products grasped on the basis of each kind of the post-machining products; and
   controlling the transfer device to transfer the selected one of the post-machining product baskets to the basket loading station based on the workpiece lot information and the product lot information so that each of the post-machining product baskets comes to contain therein the post-machining products all of which coincide in the lot information.

* * * * *